US006176559B1

(12) United States Patent
Tiramani et al.

(10) Patent No.: US 6,176,559 B1
(45) Date of Patent: Jan. 23, 2001

(54) ROLLING CONTAINERS ASSEMBLY

(75) Inventors: Paolo B. Tiramani, Greenwich; Soohyun Ham, Stamford; John A. Bozak, Greenwich, all of CT (US)

(73) Assignee: 500 Group Inc., Greenwich, CT (US)

( * ) Notice: Under 35 U.S.C. 154(b), the term of this patent shall be extended for 0 days.

(21) Appl. No.: 09/433,352

(22) Filed: Nov. 4, 1999

Related U.S. Application Data

(63) Continuation of application No. 09/017,197, filed on Feb. 2, 1998, now abandoned.

(51) Int. Cl.[7] .............................. A47B 87/02; B62B 1/26

(52) U.S. Cl. .......................... 312/108; 312/902; 312/237; 312/244; 312/249.1; 312/249.8; 280/47.19; 280/47.26; 280/47.35

(58) Field of Search .................................... 312/108, 902, 312/244, 249.1, 249.8, 293.1, 293.3, 298, 301, 302, 308, 237, 249.12; 280/33.998, 37, 47.35, 47.24, 47.26, 652, 655, 655.1, 47.19; 206/509, 821, 349, 373, 372, 315.11; 220/4.27; 242/533.8, 403, 403.1; 190/15.1

(56) References Cited

U.S. PATENT DOCUMENTS

| | | | |
|---|---|---|---|
| Re. 32,510 | 9/1987 | Tisbo et al. . | |
| D. 182,926 | 5/1958 | Roeder . | |
| D. 272,954 | 3/1984 | Sparks . | |
| D. 338,306 | 8/1993 | White et al. | D34/24 |
| 339,256 | 4/1886 | Benedict . | |
| D. 344,383 | 2/1994 | Ek | D34/25 |
| D. 347,404 | 5/1994 | Ek | D11/143 |
| D. 371,663 | 7/1996 | Muller-Deisig et al. | D34/25 |
| 1,149,639 | 8/1915 | Doust, Jr. . | |
| 1,227,536 | 5/1917 | Hartman . | |
| 1,496,216 | 6/1924 | Groth . | |
| 1,828,248 | 10/1931 | Hallowell et al. . | |
| 1,932,045 | 10/1933 | Olson . | |
| 2,016,421 | 10/1935 | Eichner . | |
| 2,233,003 | 2/1941 | Epps . | |
| 2,237,539 | 4/1941 | Adams et al. . | |
| 2,514,849 | 7/1950 | Dewing . | |
| 2,555,178 | 5/1951 | Young . | |
| 2,580,618 | 1/1952 | Terrell . | |
| 2,603,500 | 7/1952 | Messier . | |
| 2,668,977 | 2/1954 | Reece . | |
| 2,705,114 | 3/1955 | Worsham . | |
| 2,757,012 | 7/1956 | Leffler . | |
| 2,819,938 | 1/1958 | Zerver . | |
| 2,883,731 | 4/1959 | Wells . | |
| 2,893,749 | 7/1959 | Simonsen | 280/47.19 |

(List continued on next page.)

FOREIGN PATENT DOCUMENTS

| | | |
|---|---|---|
| 682733 A5 | 11/1993 | (CH) . |
| 8813391 U | 3/1989 | (DE) . |
| 0 319 969 | 6/1989 | (EP) . |
| 219771 | 8/1924 | (GB) . |
| 1 588 590 | 4/1981 | (GB) . |
| 2 214 899 | 9/1989 | (GB) . |
| 1749098 | 7/1992 | (SU) . |
| 91/05720 | 5/1991 | (WO) . |
| 94/15824 | 7/1994 | (WO) . |
| WO96/40567 | 12/1996 | (WO) . |
| 98/52811 | 11/1998 | (WO) . |

OTHER PUBLICATIONS

Craftsman Catalog "Power & Hand Tools", pp. 7 & 13, Jan. 1994.*

* cited by examiner

*Primary Examiner*—James O. Hansen
(74) *Attorney, Agent, or Firm*—Pillsbury Madison & Sutro LLP

(57) ABSTRACT

A rolling containers assembly including (a) a base cabinet including wheels and a pulling handle for locomoting the rolling containers assembly; and (b) at least one additional cabinet being removably connectable on top of the base cabinet.

21 Claims, 27 Drawing Sheets

U.S. PATENT DOCUMENTS

| | | | | |
|---|---|---|---|---|
| 2,901,261 | | 8/1959 | Olvey . | |
| 2,905,480 | | 9/1959 | Giovannelli . | |
| 2,964,328 | | 12/1960 | Muir | 280/47.19 |
| 2,969,830 | | 1/1961 | Thompson . | |
| 2,981,549 | | 4/1961 | Hotton | 280/47.35 |
| 3,014,732 | | 12/1961 | Schemenauer . | |
| 3,072,357 | | 1/1963 | Sprague et al. . | |
| 3,087,740 | | 4/1963 | Mitty et al. . | |
| 3,089,745 | | 5/1963 | Postula et al. | 312/324 |
| 3,118,685 | | 1/1964 | Jordan . | |
| 3,134,555 | | 5/1964 | Baker . | |
| 3,170,710 | | 2/1965 | Rachman . | |
| 3,413,663 | | 12/1968 | Swann . | |
| 3,420,540 | | 1/1969 | Bird . | |
| 3,429,633 | | 2/1969 | Flatt | 312/324 |
| 3,436,093 | | 4/1969 | Ruffley, Jr. . | |
| 3,494,631 | | 2/1970 | Kreider . | |
| 3,520,583 | | 7/1970 | Case | 312/277 |
| 3,552,579 | * | 1/1971 | Simon | 312/108 X |
| 3,715,148 | | 2/1973 | Beals | 312/209 |
| 3,734,526 | | 5/1973 | Propst et al. . | |
| 3,771,848 | | 11/1973 | Claywell . | |
| 3,804,432 | | 4/1974 | Lehrman . | |
| 3,831,877 | | 8/1974 | Bennett et al. . | |
| 3,856,230 | | 12/1974 | Zimmer . | |
| 3,873,114 | | 3/1975 | Brown . | |
| 3,874,531 | | 4/1975 | Mayo . | |
| 3,876,223 | | 4/1975 | O'Reilly et al. | 280/47.19 |
| 3,897,080 | | 7/1975 | Isom | 280/47.19 |
| 3,908,831 | | 9/1975 | Brendgord | 211/88 |
| 3,912,291 | | 10/1975 | Frisch . | |
| 3,937,414 | | 2/1976 | Bank et al. . | |
| 3,990,653 | | 11/1976 | Marcell . | |
| 4,037,851 | | 7/1977 | Romero . | |
| 4,046,391 | | 9/1977 | Restad et al. . | |
| 4,054,338 | | 10/1977 | Martin | 312/282 X |
| 4,070,075 | | 1/1978 | Morgan | 312/324 X |
| 4,165,088 | | 8/1979 | Nelson | 280/47.35 |
| 4,172,567 | | 10/1979 | Post . | |
| 4,202,509 | | 5/1980 | Horn . | |
| 4,281,843 | | 8/1981 | Johnson et al. | 280/47.26 |
| 4,285,556 | | 8/1981 | Loeffel | 312/244 |
| 4,288,134 | | 9/1981 | Knaack et al. | 312/290 |
| 4,350,366 | | 9/1982 | Helms . | |
| 4,363,496 | | 12/1982 | Schreiner | 280/47.35 |
| 4,378,828 | | 4/1983 | Shiminski | 312/258 X |
| 4,391,422 | | 7/1983 | McDonald . | |
| 4,457,527 | | 7/1984 | Lowery | 312/237 X |
| 4,537,106 | | 8/1985 | Rider . | |
| 4,564,152 | | 1/1986 | Herriage . | |
| 4,585,130 | | 4/1986 | Brennan . | |
| 4,611,645 | | 9/1986 | Whisnant . | |
| 4,662,515 | * | 5/1987 | Newby, Sr. | 312/902 X |
| 4,674,665 | | 6/1987 | Van Kirk . | |
| 4,691,397 | | 9/1987 | Netzer . | |
| 4,733,703 | | 3/1988 | Cimino . | |
| 4,759,560 | | 7/1988 | Virgulti | 280/47.26 |
| 4,786,122 | | 11/1988 | Nichoalds . | |
| 4,822,116 | | 4/1989 | Relyea et al. | 312/209 |
| 4,856,435 | | 8/1989 | Larson | 108/134 |
| 4,865,346 | | 9/1989 | Carlile . | |
| 4,880,248 | | 11/1989 | Elmer | 280/47.35 |
| 4,936,594 | | 6/1990 | Oliver, III | 280/47.19 |
| 4,982,863 | | 1/1991 | Skillius . | |
| 4,989,291 | | 2/1991 | Parent | 280/47.19 X |
| 4,998,743 | | 3/1991 | Thielen . | |
| 5,005,847 | | 4/1991 | King et al. | 280/47.19 |
| 5,011,013 | * | 4/1991 | Meisner et al. | 312/902 X |
| 5,011,240 | | 4/1991 | Kelley et al. | 312/264 X |
| 5,013,055 | | 5/1991 | Labrum | 280/47.19 |
| 5,016,946 | * | 5/1991 | Reznikov et al. | 312/108 |
| 5,016,948 | | 5/1991 | Welch et al. | 312/257.1 X |
| 5,069,466 | * | 12/1991 | Propst | 312/328 X |
| 5,113,546 | | 5/1992 | Parent . | |
| 5,152,441 | | 10/1992 | Torena | 312/902 X |
| 5,154,441 | | 10/1992 | White et al. . | |
| 5,160,154 | | 11/1992 | Seydel et al. . | |
| 5,193,706 | * | 3/1993 | Hanna et al. | 312/902 X |
| 5,213,351 | | 5/1993 | Chen | 280/47.19 |
| 5,224,531 | | 7/1993 | Blohm | 144/285 |
| 5,240,264 | | 8/1993 | Williams . | |
| 5,244,265 | * | 9/1993 | Chiang | 312/902 X |
| 5,265,893 | | 11/1993 | Ettlin . | |
| 5,275,349 | | 1/1994 | Tussing . | |
| 5,281,020 | | 1/1994 | Romick | 312/308 |
| 5,285,981 | | 2/1994 | Pavelka . | |
| 5,294,196 | | 3/1994 | Chen | 312/263 |
| 5,308,012 | | 5/1994 | Fuller . | |
| 5,318,315 | | 6/1994 | White et al. | 280/47.26 |
| 5,330,263 | * | 7/1994 | Wilkinson | 312/328 |
| 5,368,143 | * | 11/1994 | Pond et al. | 280/37 X |
| 5,378,005 | | 1/1995 | Norton | 280/47.26 |
| 5,423,651 | | 6/1995 | Dinverno | 312/249.8 X |
| 5,425,545 | | 6/1995 | McCusker | 280/30 |
| 5,437,369 | | 8/1995 | Spitere | 206/373 |
| 5,437,502 | | 8/1995 | Warnick et al. | 312/244 |
| 5,452,908 | | 9/1995 | Bencic | 280/47.35 |
| 5,464,104 | | 11/1995 | McArthur | 211/133 |
| 5,464,280 | | 11/1995 | Runger | 312/249.11 |
| 5,482,162 | * | 1/1996 | Dickinson | 312/902 X |
| 5,484,160 | | 1/1996 | Ek | 280/47.19 X |
| 5,503,571 | | 4/1996 | Cheslock | 439/501 |
| 5,509,671 | | 4/1996 | Campbell | 280/47.24 |
| 5,509,672 | | 4/1996 | Offerson | 280/47.35 |
| 5,513,066 | * | 4/1996 | Berman | 280/47.26 X |
| 5,518,258 | | 5/1996 | Cox | 280/47.19 X |
| 5,518,310 | | 5/1996 | Ellman et al. | 312/249.12 |
| 5,528,453 | | 6/1996 | Berman et al. | 312/249.8 X |
| 5,533,799 | | 7/1996 | Nickolaus, Jr. | 312/249.12 |
| 5,551,773 | | 9/1996 | Cottrell | 312/249.8 |
| 5,577,745 | | 11/1996 | Birk | 280/47.19 |
| 5,588,659 | | 12/1996 | Boes et al. | 280/47.19 |
| 5,603,559 | * | 2/1997 | Yemini | 312/244 X |
| 5,634,649 | | 6/1997 | Breining et al. | 280/47.35 |
| 5,664,652 | * | 9/1997 | Shamah | 190/15.1 X |
| 5,664,853 | | 9/1997 | Nickolaus, Jr. | 312/249.12 |
| 5,667,163 | | 9/1997 | Sordahl . | |
| 5,680,932 | * | 10/1997 | Dickinson et al. | 312/902 X |
| 5,683,097 | * | 11/1997 | Fenton et al. | 280/655.1 |
| 5,738,423 | | 4/1998 | Alfaro | 312/290 |
| 5,762,411 | * | 6/1998 | Yemini | 312/902 X |
| 5,799,958 | | 9/1998 | Bishop | 280/47.26 |
| 5,823,337 | * | 10/1998 | Yunger et al. | 206/315.11 |
| 5,857,757 | * | 1/1999 | Bieker et al. | 312/902 X |

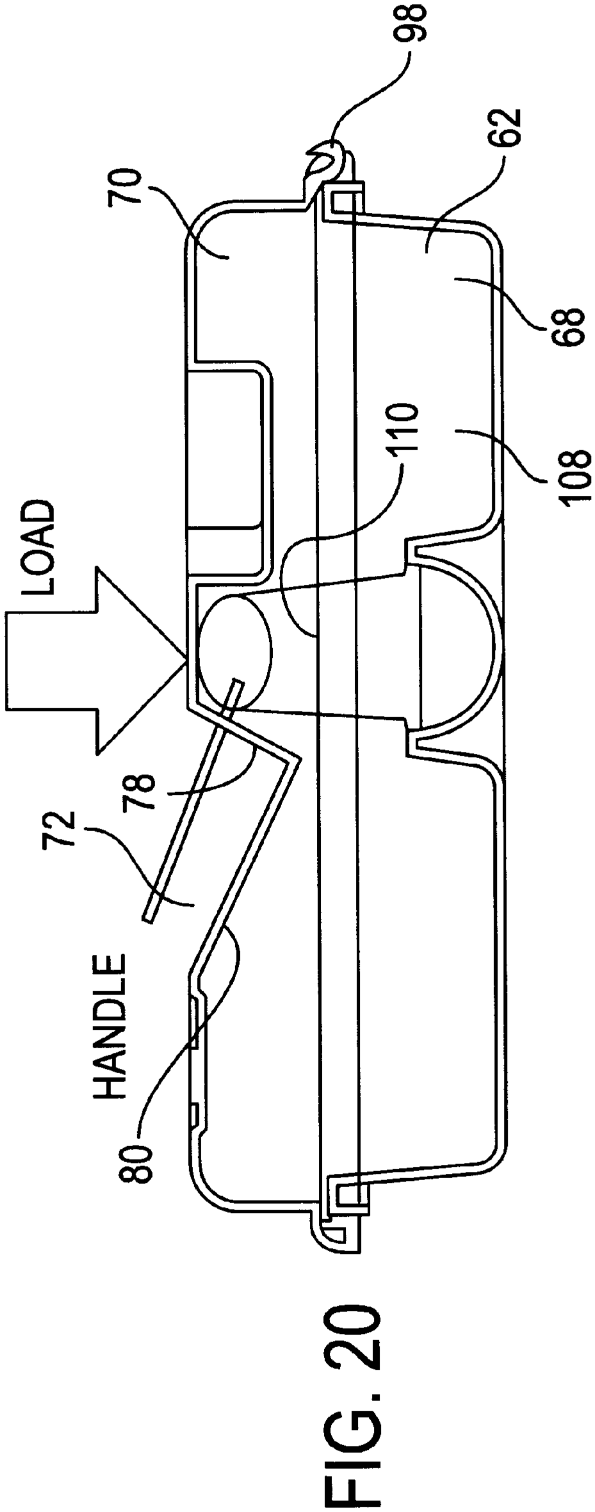
FIG. 20
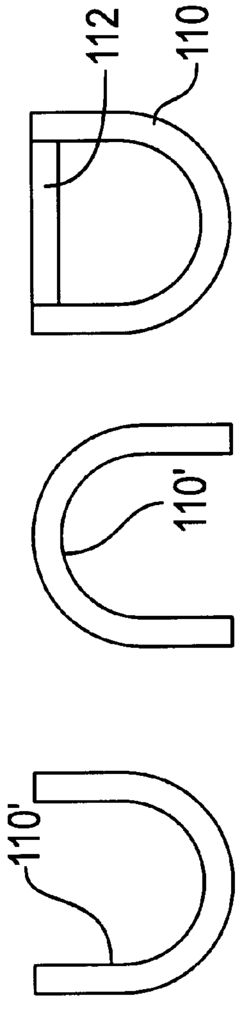
FIG. 21A (PRIOR ART)
FIG. 21B (PRIOR ART)
FIG. 21C

ROLLING CONTAINERS ASSEMBLY

This is a continuation of application Ser. No. 09/017,197, filed Feb. 2, 1998, now abandoned.

FIELD AND BACKGROUND OF THE INVENTION

The present invention relates to an apparatus for transporting articles, such as hand tools and similar items, between desired locations.

When working in fields such as carpentry and other similar trades, it is often necessary to work in a number of different locations on one job site. For example, during a given work day, a carpenter may be required to undertake activities in a number of different rooms in a house he or she is working on. Most tradesmen hand carry their tools in tool boxes and other similar containers from location to location. Many times, the activities undertaken require more tools than can be easily carried from one location to another in one trip.

Rolling worktables heretofore provided, such as the one disclosed in U.S. Pat. No. 4,856,435, are somewhat useful for allowing a worker to transport all the required tools and equipment from location to location. However, this type of rolling worktable has limited usefulness because it cannot be easily rolled up and down stairs as a result of its having a large horizontal area rollingly supported on four wheels.

U.S. Pat. No. 5,240,264 discloses a two-wheeled dolley-type assembly with a frame and a set of containers. This type of device is better suited for transporting tools up and down stairs. However, this device is lacking in certain aspects. When assembled, all the containers in '264 device are secured together and cannot be separated without disassembling the device. Thus, once a worker has chosen this device for transporting his tools and other equipment, he must continue using this device until he removes the tools from the device for carriage in a standard tool box or other carrying device. Another disadvantage of this device is that it cannot be easily used for transporting large articles because the stack of containers extend nearly fully to the handle, thus leaving little of no room to safely stack large items that the user desires to rollingly transport.

SUMMARY OF THE INVENTION

It is therefore an object of the invention to overcome the shortcomings of the prior art and provide a superior device for transporting articles between locations. To achieve this object the present invention provides an apparatus for transporting articles. The apparatus comprises a removable storage container in which articles to be transported can be stored and a wheeled device. The wheeled device comprises a fixed storage container in which articles to be transported can be stored, one or more rotatable ground engaging wheels that rollingly support the wheeled device, structure providing a generally downwardly facing fixed ground engaging surface, a manually engageable handle member extending generally upwardly away from the fixed container, and removable container supporting structure constructed and arranged to removably support the removable storage container.

The removable storage container is removably mounted on the removable container supporting structure of the wheeled device such that the supporting structure supports the removable container above the fixed storage container and such that the removable storage container can be removed and handled separately from the fixed storage container. The handle member and the one or more ground engaging wheels of the wheeled device are constructed and arranged to enable the wheeled device to be tilted rearwardly from (a) a substantially upright position wherein the fixed ground engaging surface engages the ground so as to stably support the wheeled device in a freestanding manner to (b) a tilted rolling movement position wherein the fixed ground engaging surface is moved generally upwardly out of engagement with the ground in such a manner that the wheeled device is rollingly supported by the ground engaging wheels with the weight of the wheeled device and the removable container being supported only by the one or more ground engaging wheels and the portion of the handle member engaged by the user, thereby enabling the user to roll the apparatus to a desired location by pushing or pulling the handle member in a desired direction.

This removable container feature is particularly advantageous because it allows the user to carry the removable container from to a desired location that would be otherwise inaccessible for the entire apparatus, such as a small crawl space. Otherwise, the tools would have to removed from the apparatus and carried by hand. This aspect is particularly useful when the removable container has a handle member, such as a tool box. Also, this removability is particularly advantageous when it is desired to use the apparatus as a load carrying device. The removable container, whether it be a set of sliding drawers, a tool box, a top loading bin, or some other type of container, can be removed and the load to be carried can be disposed on the removable container supporting structure, thus allowing the apparatus to act as a regular load carrying device.

Another aspect of the present invention relates to an apparatus for transporting articles, including elongated flexible such as extension cords. U.S. Pat. No. 5,378,005 discloses one such type of apparatus that provides hooks on the rear portion of the apparatus for carrying an extension cord. U.S. Pat. No. 4,457,527 to Lowery discloses another apparatus that carries spools of wire in the front and a reel that may carry an extension cord in the back. The Lowery apparatus provides stationary as opposed to sliding drawers. The apparatus in accordance with the present invention comprises a drawer supporting frame assembly, structure providing a generally downwardly facing, fixed ground engaging surface, one or more rotatable ground engaging wheels constructed and arranged to rollingly support the wheeled device, and a manually engageable handle member. A storage drawer is configured to receive articles to be transported, and a flexible member storage means is provided for restraining an elongated flexible member in a wound manner thereon against lateral movement. The storage drawer is selectively moveable between (1) an open position wherein the drawer extends outwardly from the frame to permit access to the interior space and (2) a closed position wherein the drawer is received within the frame so as to prevent access to the interior space. The handle member and the one or more ground engaging wheels of the wheeled device are constructed and arranged to enable the frame assembly to be tilted rearwardly from (a) a substantially upright position wherein the fixed ground engaging surface engages the ground so as to stably support the frame assembly in a freestanding manner to (b) a tilted rolling movement position wherein the fixed ground engaging surface is moved generally upwardly out of engagement with the ground in such a manner that the frame assembly is rollingly supported by the ground engaging wheels with the weight of the frame assembly being supported only by the one or more ground engaging wheels and the portion of the handle member engaged by the user, thereby enabling the user to roll the apparatus to a desired location by pushing or pulling the handle member in a desired direction.

According to further features in preferred embodiments of the invention described below, the rolling containers assembly comprising (a) a base cabinet including wheels and a pulling handle for locomoting the rolling containers assembly; and (b) at least one additional cabinet being removably connectable on top of the base cabinet.

According to still further features in the described preferred embodiments the handle is extendible.

According to still further features in the described preferred embodiments the at least one additional cabinet is selected from the group consisting of a drawers assembly and a toolcase.

According to still further features in the described preferred embodiments the base cabinet includes a reel.

According to still further features in the described preferred embodiments the at least one additional cabinet is a modular unit.

According to still further features in the described preferred embodiments the at least one additional cabinet snaps onto the base cabinet.

According to still further features in the described preferred embodiments the toolcase includes a case and an openable cover.

According to still further features in the described preferred embodiments the cover is formed with an external groove usable in supporting rectangular and round objects.

According to still further features in the described preferred embodiments the groove is asymmetrical in cross section.

According to still further features in the described preferred embodiments the groove is formed between a first wall and a second wall of the cover deployed in a V shape, the first wall is deployed 63±15 degrees with respect to the cover, the second wall is deployed 27±15 degrees with respect to the cover, whereas the first and second walls are deployed 90 degrees with respect to one another.

According to still further features in the described preferred embodiments the groove is formed with grip ribs on at least a section thereof.

According to still further features in the described preferred embodiments the cover is formed with underlying strengthening ribs.

According to still further features in the described preferred embodiments the underlying strengthening ribs are deployed crosswise with respect to one another and obliquely with respect to an edge of the cover, such that triangle shapes are formed along the edge.

According to still further features in the described preferred embodiments the underlying strengthening ribs are deployed 90 degrees crosswise with respect to one another and 45 degrees with respect to an edge of the cover.

According to still further features in the described preferred embodiments the cover is formed with external protrusions deployed above the underlying strengthening ribs, the external protrusions serve for at least partially disguising sink marks associated with the ribs.

According to still further features in the described preferred embodiments the external protrusions have a diamond shape.

According to still further features in the described preferred embodiments the cover includes a carrying handle.

According to still further features in the described preferred embodiments the carrying handle is foldable.

According to still further features in the described preferred embodiments the toolcase includes at least one latch for securing the cover to the case when closed.

According to still further features in the described preferred embodiments the toolcase includes front sides and back, the sides taper toward the back.

According to still further features in the described preferred embodiments the front is curved.

According to still further features in the described preferred embodiments the toolcase includes a tray deployable within the case.

According to still further features in the described preferred embodiments the tray includes a tray-handle.

According to still further features in the described preferred embodiments toolcase includes a foldable carrying handle having side arms, the tray includes a tray-handle, the tray-handle nests between the side arms of the carrying handle of the cover.

According to still further features in the described preferred embodiments the drawers assembly includes a casing and at least one translating drawer translatably engaged by the casing.

According to still further features in the described preferred embodiments the at least one drawer translates over rails connected to the casing.

According to still further features in the described preferred embodiments all of the at least one drawer are securable close via a single securing member.

According to still further features in the described preferred embodiments the handle is extendible, the single securing member is attached to the handle, such that when the handle is retracted the securing member secured all of the at least one drawer closed.

According to still further features in the described preferred embodiments the base cabinet includes a casing to which the handle and the wheels are engaged and a flipping bin.

According to still further features in the described preferred embodiments the flipping bin is rotatable with respect to the casing and has an upper opening.

According to still further features in the described preferred embodiments the casing is formed with an upper rim, the rim is supplemented with holes which serve for attaching strings for effecting carriage of desired items on the top of the base cabinet when the at least one additional cabinet is removed.

According to still further features in the described preferred embodiments the handle is formed with additional holes which further serve for attaching strings for effecting the carriage of the desired items on the top of the base cabinet when the at least one additional cabinet is removed.

According to still further features in the described preferred embodiments the base cabinet includes a reel rotatable attached to the casing.

According to still further features in the described preferred embodiments the reel is removable.

According to still further features in the described preferred embodiments the casing is supplemented with at least two elastic bands designed for engaging desired items along a side thereof According to still further features in the described preferred embodiments the flipping bin is rotatably connected to the casing via a hinge located such that the bin opens when reaches beyond a center of gravity point and closes when is before the center of gravity point.

According to still further features in the described preferred embodiments the pulling handle is detachable.

According to still further features in the described preferred embodiments the at least one additional cabinet is selected from the group consisting of a clamshell style case and carousel organizer.

According to still further features in the described preferred embodiments provided is a rolling containers assembly for storing working tools comprising (a) a base cabinet including wheels for locomoting the rolling containers assembly; and (b) at least one additional cabinet being removably connectable on top of the base cabinet, the at least one additional cabinet including a pulling handle for effecting the locomotion.

According to still further features in the described preferred embodiments the at least one additional cabinet is selected from the group consisting of a clamshell style case and carousel organizer.

The present invention successfully addresses the shortcomings of the presently known configurations by providing a modular rolling containers assembly featuring a retractable/extendible back handle.

Other objects, features, and advantages of the present invention will become apparent from the following detailed description, the accompanying drawings, and the appended claims.

BRIEF DESCRIPTION OF THE DRAWINGS

The invention herein described, by way of example only, with reference to the accompanying drawings, wherein:

FIG. 20 is a side view of the tray and cover of the toolcase of the rolling containers assembly according to the present invention;

FIGS. 21*a*, 21*b* and 21*c* are schematic cross sectional views of two prior art tray handles, and a tray handle according to the present invention;

DESCRIPTION OF THE PREFERRED EMBODIMENTS

Figure 1:
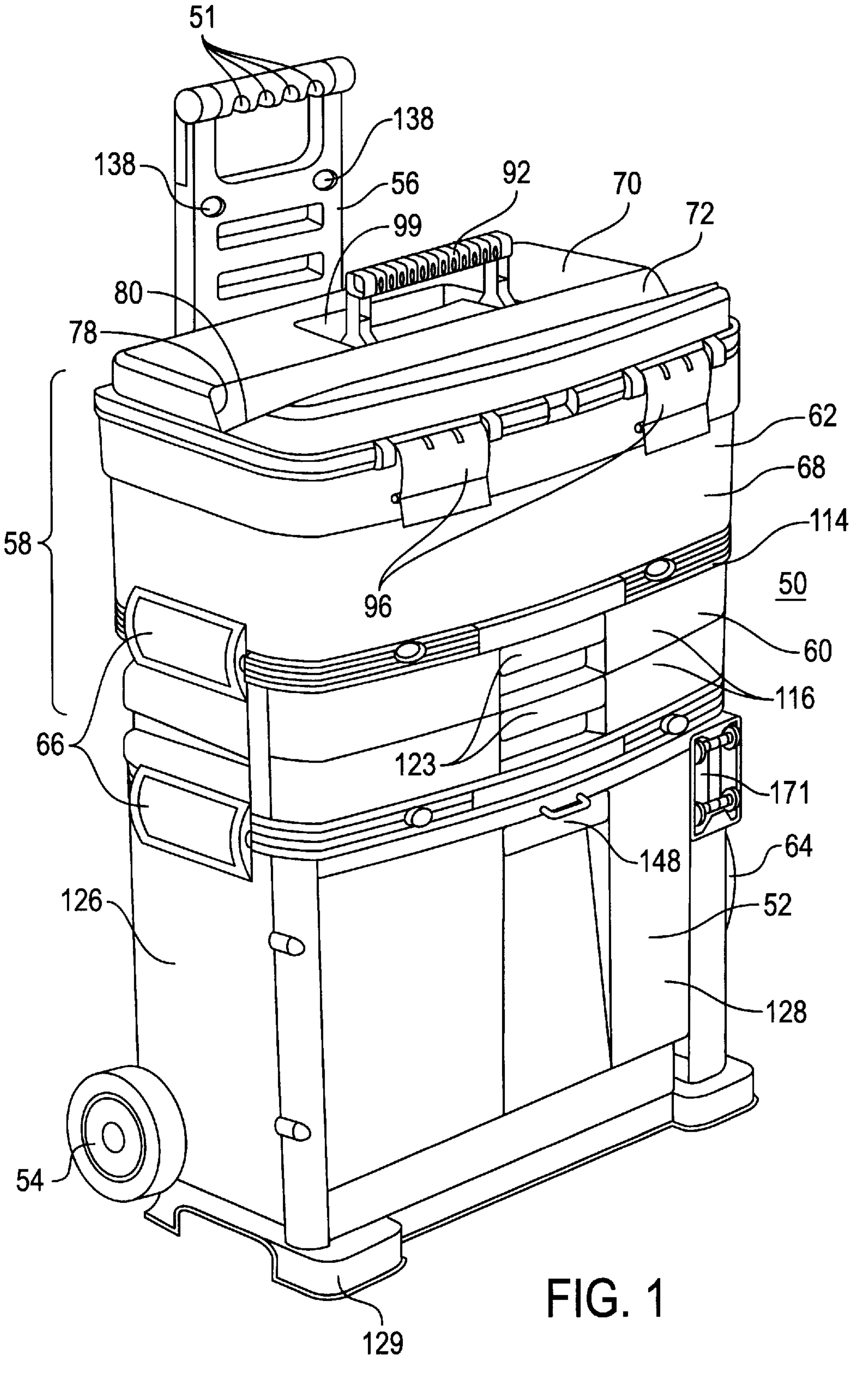
FIG. 1 is a perceptive front view of a rolling containers assembly acting to the present invention.
Figure 2:
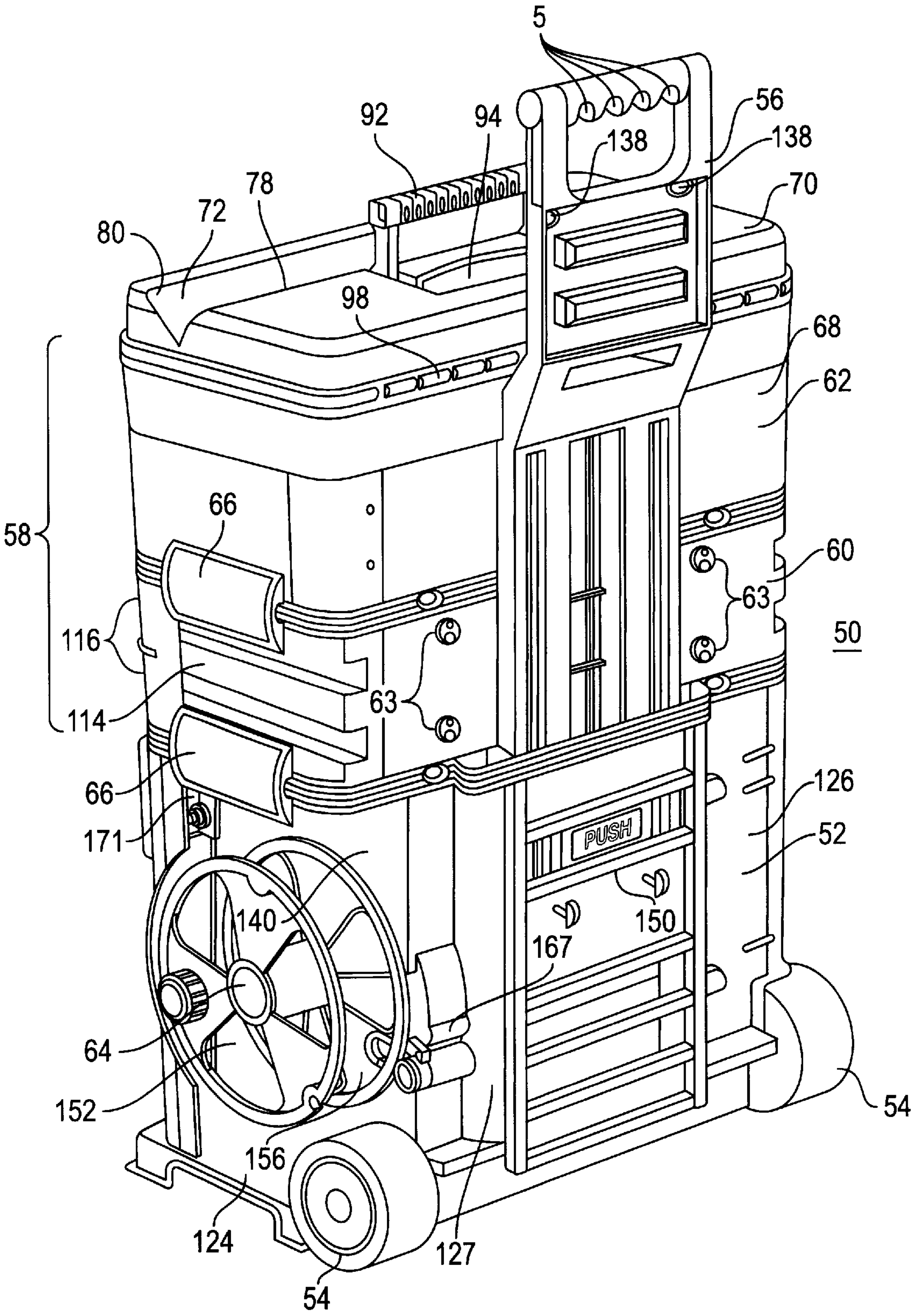
FIGS. 2 and 3 are perceptive rear views of the rolling containers assembly shown in FIG. 1.
Figure 3:
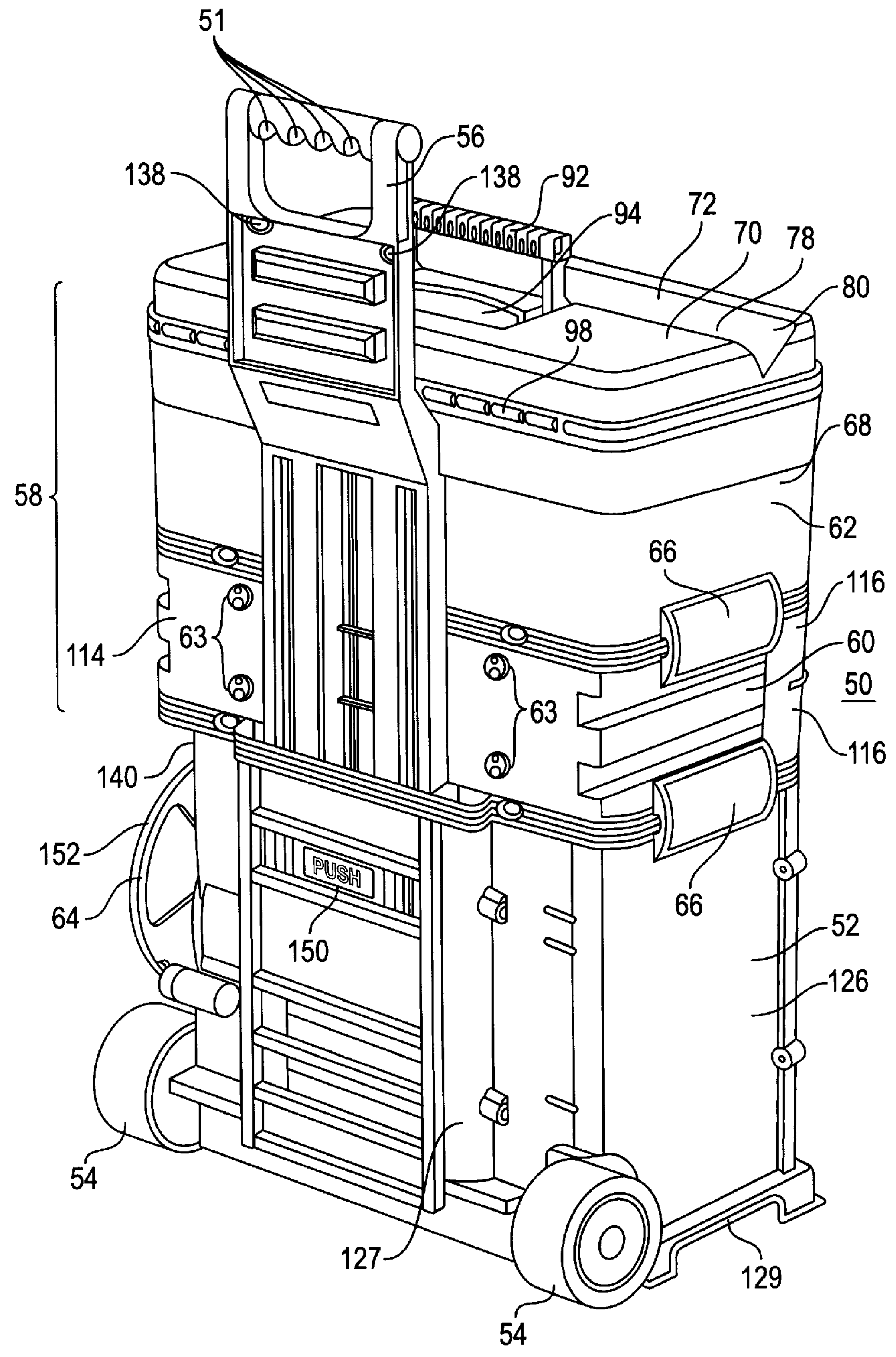
Figure 4:
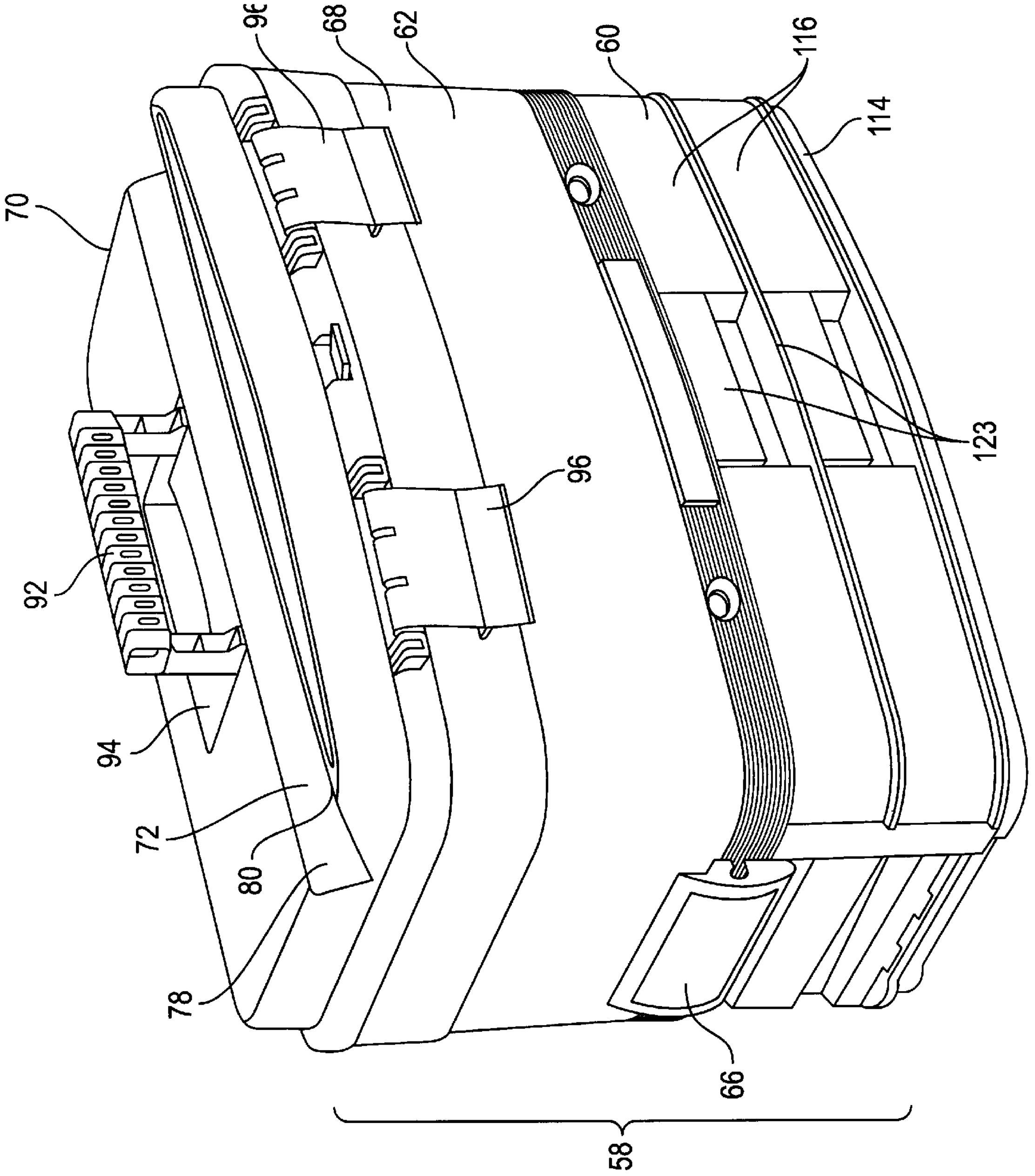
FIGS. 4 and 5 are perspective front views of a toolcase and a drawers assembly of the rolling containers assembly according to the present invention.
Figure 5:
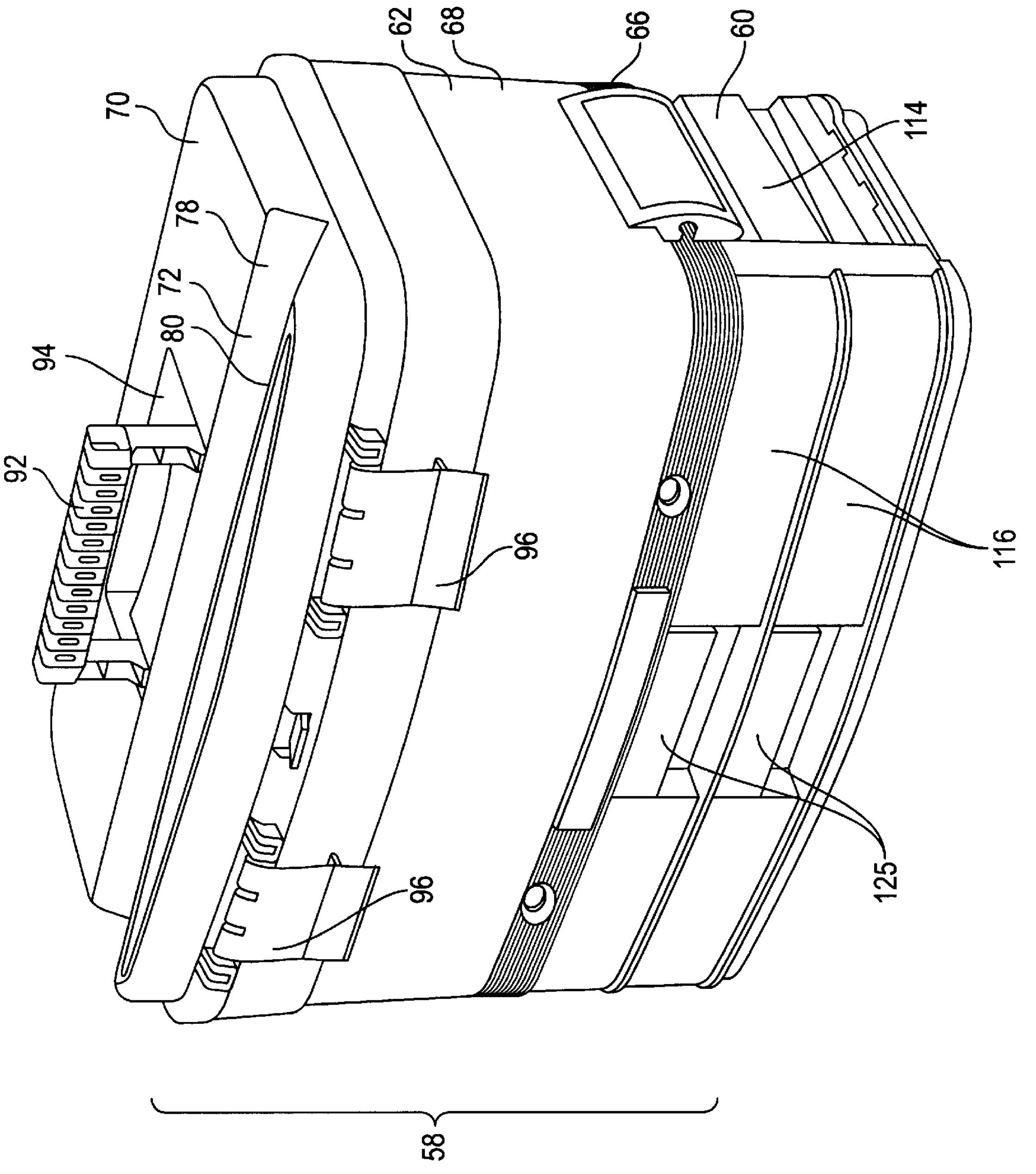

The present invention relates to an apparatus for transporting articles, or a rolling containers assembly, which can be used as a rolling workshop. Specifically, the present invention can be used to assist workers, such as, but not limited to, construction workers, fishermen, repairmen, etc., to carry their working tools in an organized fashion.

The principles and operation of a rolling containers assembly according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIGS. 1–26*b* illustrate some preferred embodiments of a rolling containers assembly according to the present invention, which is referred to hereinbelow interchangeably as rolling containers assembly 50 or assembly 50.

Thus, rolling containers assembly 50 serves for storing working tools and includes a fixed container or base cabinet 52. At its lower aft end base cabinet 52 is supplemented with a pair of ground engaging wheels 54. At its aft base cabinet 52 includes a manually engageable handle 56. Wheels 54 and handle 56 serve for locomoting assembly 50. Together, the cabinet 52, the wheels 54, and the handle 5*b* may be considered a wheeled device.

Pulling handle 56 is shaped, sized and designed to assist a user to pull assembly 50. For example, its upper part is designed to comfortably accept the hand of the user, and is therefore supplemented with four finger accepting recessions 51.

Rolling containers assembly 50 further includes at least one additional cabinet 58 in the form of a removable container. Additional cabinet 58 is removably connectable on top of base cabinet 52. Specifically, the upper surface of the base cabinet 52 provides container supporting structure and the additional cabinet 58 is removably mounted atop this structure.

As further detailed hereinbelow, according to a preferred embodiment of the invention handle 56 is extendible/retractable.

As further detailed hereinbelow, according to another preferred embodiment of the present invention, additional cabinet(s) 58 include, for example, a drawers assembly 60 and/or a toolcase 62.

As further detailed hereinbelow, according to another preferred embodiment of the present invention base cabinet 52 is supplemented with a coil storage device in the form of a reel 64.

As best seen in FIG. 12 additional containers 58 are preferably designed modular, such that any combination thereof is deployable over base cabinet 52 or as a standalone configuration. Thus, for example, a plurality of drawer assemblies 62 may be snapped together as an independent drawers tower system with keyholes 63 formed in the rear for wall mounting.

Connecting any of additional cabinet(s) 58 to base cabinet 52 preferably involves snapping. To this end, base cabinet 52 and the additional cabinet(s) 58 are designed snappable to one another, and, to this end, are supplemented with snapping mechanisms 66, which preferably also serve as side claw latches for providing extra stability.

Figure 15A:
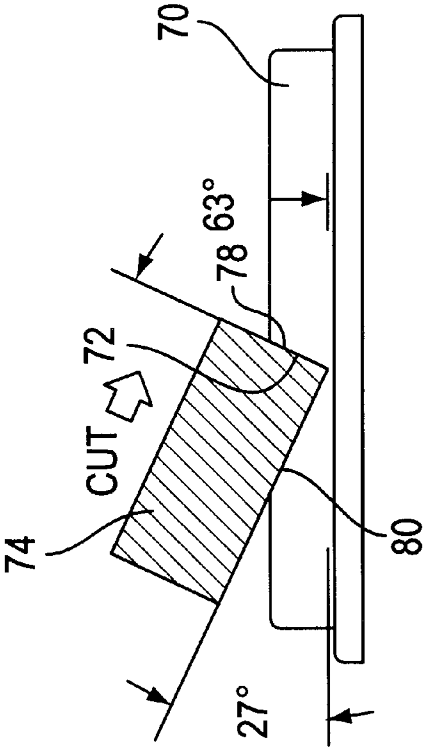
FIGS. 15*a* and 15*b* are cross sections demonstrating the ability of the asymmetric groove according to the present invention to support rectangular and round objects, respectively.
Figure 15B:
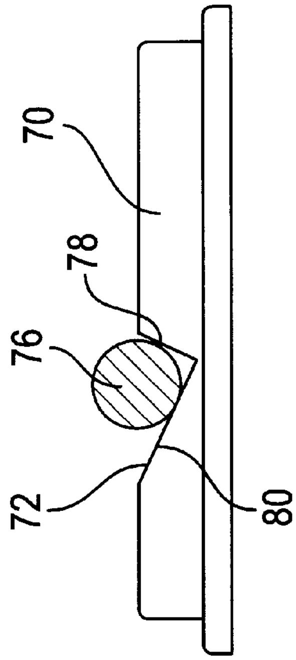

According to a preferred embodiment of the invention toolcase 62 includes a case 68 and an openable cover 70. Cover 70 is preferably fabricated featuring an external groove 72. Groove 72 is usable in supporting rectangular 74 and/or round 76 objects (FIGS. 15*a–b*). Groove 72 is preferably asymmetrical in cross section. Preferably, groove 72 is formed as a recess residing between a first wall 78 and a second wall 80 of cover 70. Walls 78 and 80 are deployed in a V shape.

As best seen in FIGS. 15*a–b*, first wall 78 is deployed 63±15 degrees with respect to cover 70, second wall 80 is deployed 27±15 degrees with respect to cover 70, whereas first 78 and second 80 walls are deployed 90 degrees with respect to one another.

Figure 14A:
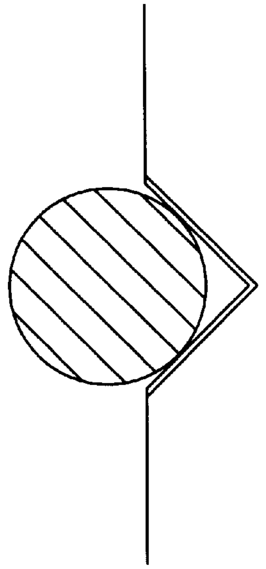
FIG. 14A (PRIOR ART)
FIGS. 14*a* and 14*b* are cross sections of two prior art symmetric grooves formed in toolcase covers.
Figure 14B:
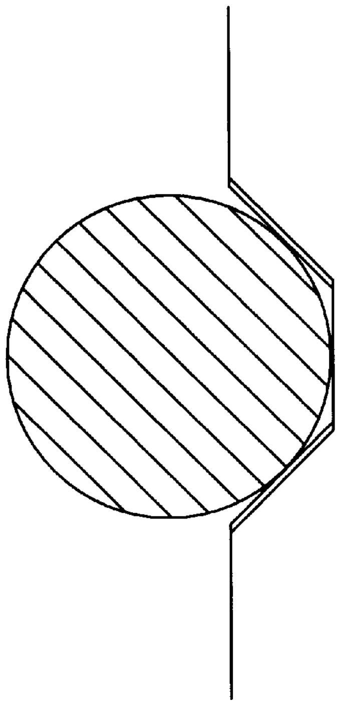
FIG. 14B (PRIOR ART)

Groove 72 is designed to facilitate cutting desired object. Grooves are known in the art for some time and serve to facilitate cutting round objects. However, all prior art grooves, as shown in FIGS. 14*a* and 14*b*, traditionally have symmetric cross sections.

As specifically shown in FIGS. 15*a–b*, groove 72, on the other hand, is selected asymmetrical. Groove's 72 architecture is specifically designed to allow cutting both rectangular wood and round pipe elements. To this end, the asymmetry of about 63/27 degrees is preferably selected. This asymmetry dictates that groove's 72 shortest side is more than half shorter than groove's 72 longest side, allowing a 2"×4" wood size to be cut in a stable manner without excess slippage.

The 63/27 degrees feature has been experimentally shown to be the most useful angle for this sort of work, however, it is feasible that for other applications other asymmetric dimensions would prove more adapted.

Therefore, according to the present invention groove 72 may have any asymmetrical or symmetrical design.

Figure 16:
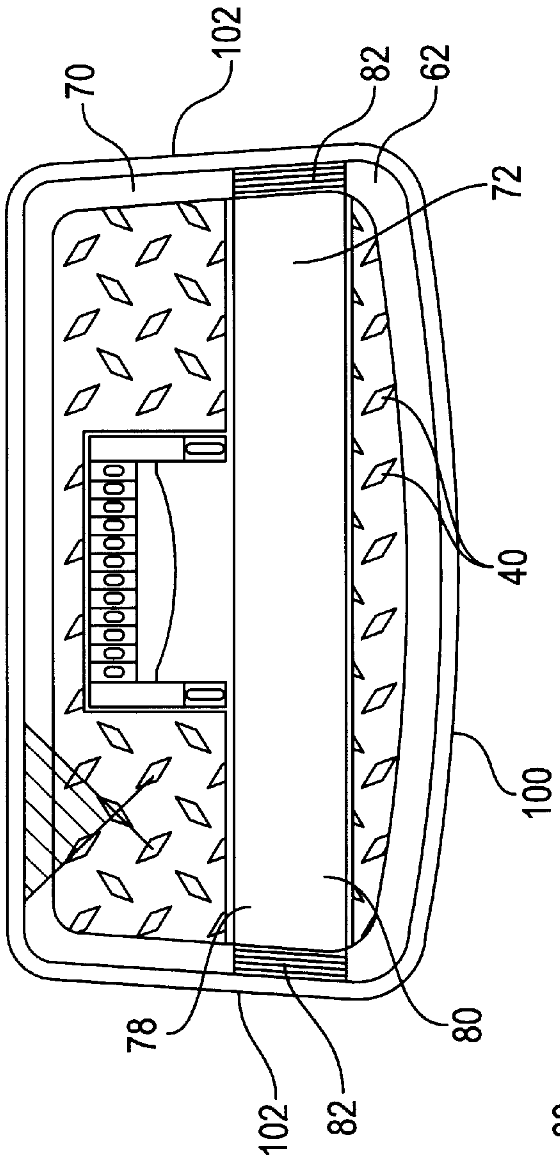
FIG. 16 is a top view of the cover of the toolcase of the rolling containers assembly according to the present invention.

As best seen in FIG. 16, groove 72 is preferably formed with grip ribs 82 on at least a section thereof. Grip ribs 82 are preferably arranged on is the outer edges of groove 72. Grip ribs 82 are designed to provide friction and thereby to minimize the vibration of the material being cut, which tends to vibrate in concert with the saw.

Figure 17A:
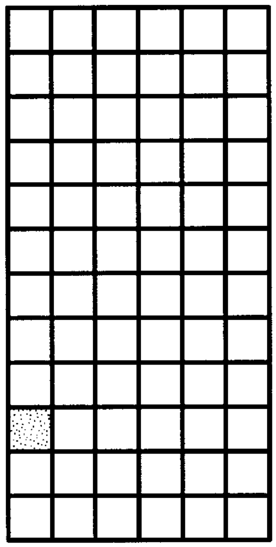
FIG. 17A (PRIOR ART)
FIGS. 17*a* and 17*b* are comparative schematic depictions of a prior art rib arrangement and a rib arrangement used to strengthen the cover of the toolcase according to the present invention, respectively.
Figure 17B:
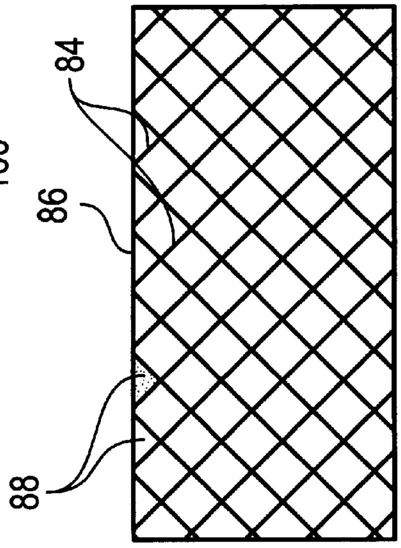

As best seen in FIGS. 16 and 17*a–b*, cover 70 is preferably formed with underlying strengthening ribs 84. Underlying strengthening ribs 84 are preferably deployed crosswise with respect to one another and obliquely with respect to an edge 86 of cover 70, such that triangular shapes 88 are formed along edge 86.

Preferably underlying strengthening ribs are deployed 90 degrees crosswise with respect to one another and 45 degrees with respect to edge 86 of cover 70.

As best seen in FIG. 16. according to a preferred embodiment of the present invention cover 70 is formed with external protrusions 90. Protrusions 90 are deployed above, parallel to, underlying strengthening ribs 84 and serve for at least partially disguising sink marks associated with ribs 84. External protrusions 84 are preferably acquired a diamond shape (♦).

It has been recent practice to heavily rib the underside of plastic toolcase covers to withstand the weight of the average person, who typically will use them as defector step tools. The "sink marks" that show on the top surface of such covers is noticeable and disguised typically with some sort of decoration running in the same direction of the ribbing.

FIG. 16 shows a section of ribs 84 arrangement on the top left end of cover 70. This ribbing preferably runs the entire underside of cover 70. As already mentioned hereinabove ribbing 84 is preferably deployed at 45 degrees orientation with respect to the edge of the cover. Thereby ribs 84 terminate in triangles 88 (FIG. 17*b*). The triangular termination around the relatively more sensitive perimeter of the cover is measurably stronger than traditional rectangular ribbing (FIG. 17*a*).

The preferred embodiment is aesthetically enabled by the chosen diamond pattern that overlays the ribs on the top side of the case (FIG. 16).

Although such diamond patterns are a common anti-slippage icon in the hardware steel industry, this is the first time to have them introduced into the plastic industry to serve as anti-slippage elements and at the same time for disguising rib sinkage marks.

According to another preferred embodiment of the present invention cover 70 includes a carrying handle 92. Carrying handle 92 is preferably foldable into a recession 94 formed in cover 70 which is sized and dimensioned for receiving handle 92 when folded.

According to another preferred embodiment of the present invention toolcase 62 includes at least one releasable latch 96 (two are shown) for releasable securing/locking cover 70 to case 68 when closed. Cover 70 is hingedly connected to case 68 via a hinge 98. Preferably, as best seen in FIG. 16, toolcase 62 includes a front 100, sides 102 and back 104, wherein sides 102 taper toward back 104. Front 100 is preferably curved.

Figure 18B:
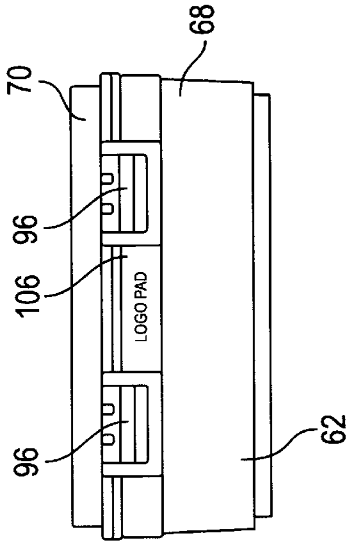
FIGS. 18*a* and 18*b* are front views of the toolcase of the rolling containers assembly according to the present invention demonstrating the addition of a Logo pad.
Figure 18A:
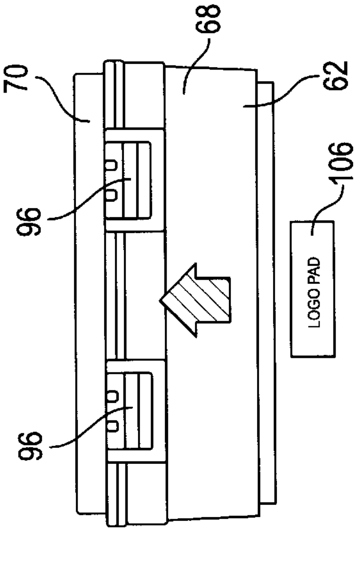

As shown in FIGS. 18*a–b*. according to a preferred embodiment of the present invention a Logo plate 106 is added between latches 96. Plate 106 is preferably a separate molded panel which is molded at 90 degrees to the rest of the case, however it appears to be an integral part of the case when assembled, rather than a separate item.

According to another preferred embodiment of the present invention, and as specifically shown in FIGS. 19–22, toolcase 62 preferably includes a removable tray 108, deployable within case 68. Tray 108 preferably includes a tray-handle 110. Preferably, as best seen in FIG. 19*b*, tray-handle 108 nests between side arms 110 of carrying handle 92 of cover 70.

Figure 19B:
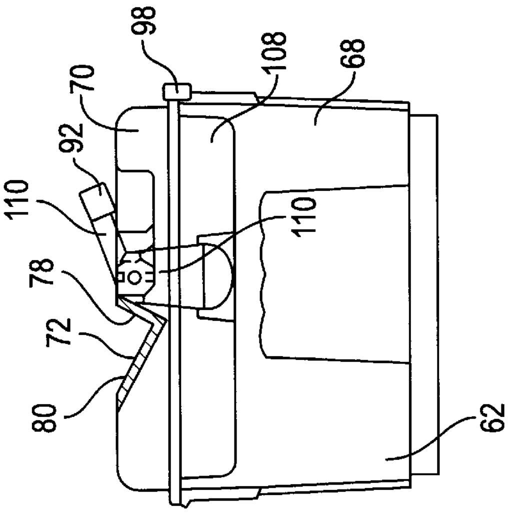
FIGS. 19*a* and 19*b* are side views of a prior art tray arrangement and a tray arrangement of the toolcase according to the present invention, respectively.
Figure 19A:
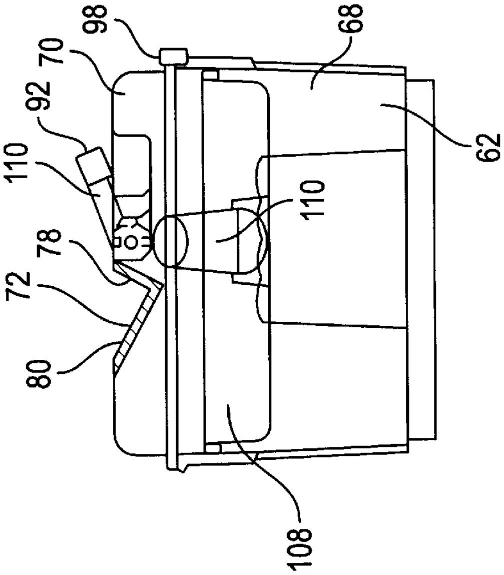
FIG. 19A (PRIOR ART)

Thus, in sharp contrast with the conventional configuration shown in FIG. 19*a*, wherein the tray handle 110' resides below the cover handle, thereby effectively lowering the tray in the case, according to the present invention, the tray handle nests between the vertical arms of the cover handle, rendering the tray about 20% higher, gaining much requested additional room in the main case.

Furthermore, with the handle residing directly underneath the cover, it now acts as a load bearing member when a user stands on the case, transmitting a partial load through the tray onto the perimeter of the base. One additional benefit is that ribs which are preferably deployed on the underside of the tray can be lighter and use less material.

A common problem with plastic tray handle designs is how to produce a solid feeling handle from both sides. Typically the handle is open from the top (FIG. 21*a*), which functions well but is not attractive, or the handle is open from the bottom (FIG. 21*b*) which looks good but can be painful to the hand.

Figure 22A:
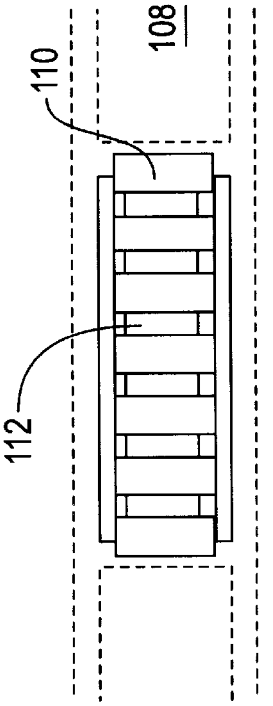
FIGS. 22*a*, 22*b* and 22*c* are top and side views of the tray handle and side view of the tray of the toolcase of the rolling containers assembly according to the present invention.
Figure 22B:
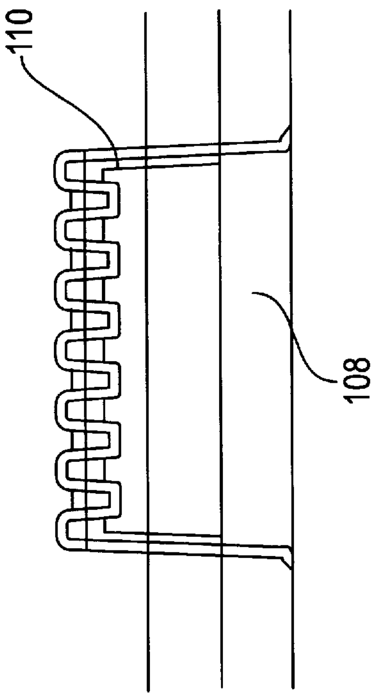
Figure 22C:
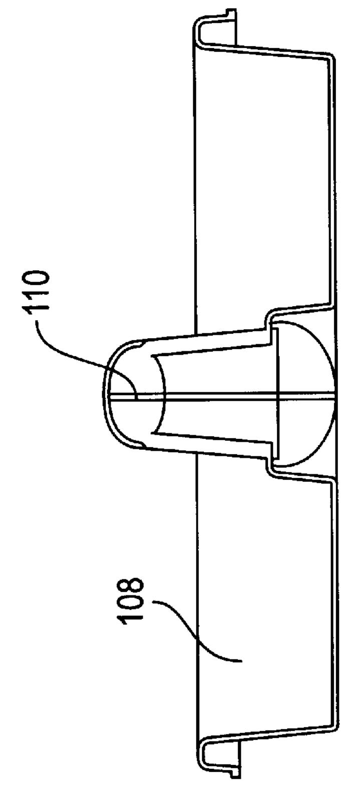

According to the present invention, as specifically shown in FIGS. 21*c* and 22*a*, an additional piece 112 is used to fill the area of a handle open from the top by snapping piece 112 into the top opening. Thereby, both functionality and aesthetic are achieved. This solution offers both solid feeling and looks to the handle and a good surface area for hand comfort.

Figure 23:
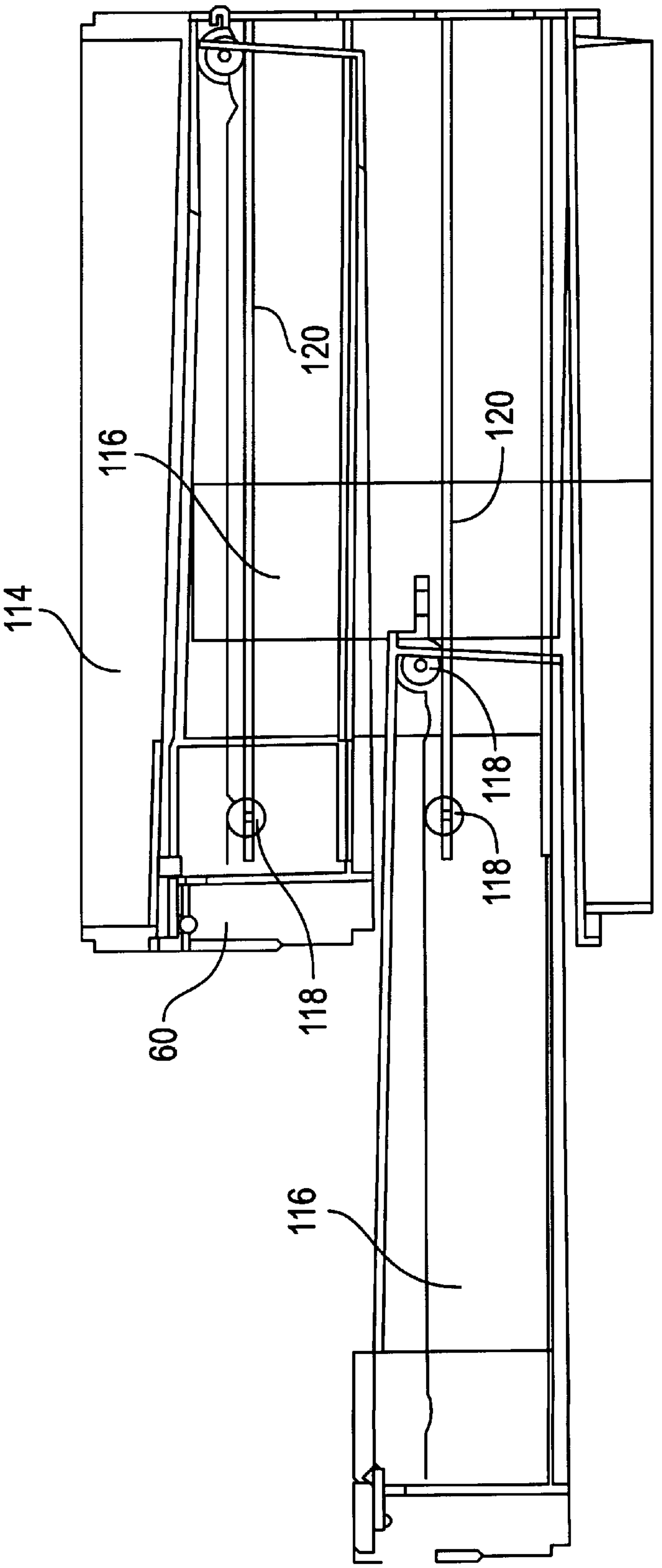
FIG. 23 is a side view of the drawers assembly of the rolling containers assembly according to the present invention.
Figure 24:
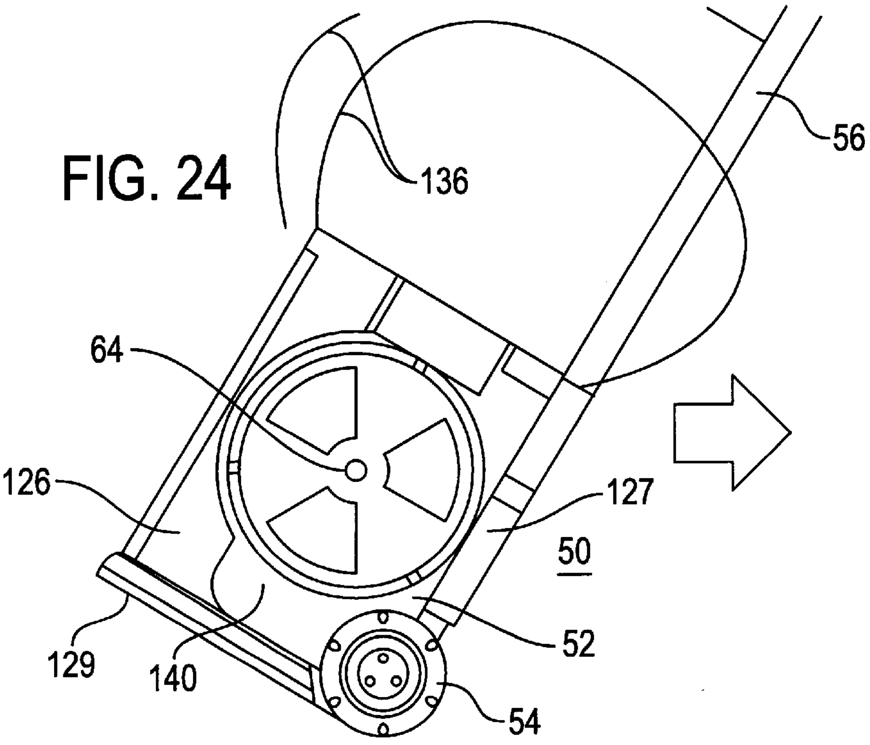
FIG. 24 is a side view of the base cabinet of the rolling containers assembly according to the present invention, demonstrating options to attach strings onto the base cabinet.

According to a preferred embodiment of the invention drawers assembly 60 includes a casing 114 and at least one translating drawer 116 (two are shown) translatably engaged by casing 114. Preferably, as shown in FIG. 23, drawer(s) 116, aided by reels 118, translate over rails 120 which are connected to, or integrally formed with, casing 114.

Figure 6:
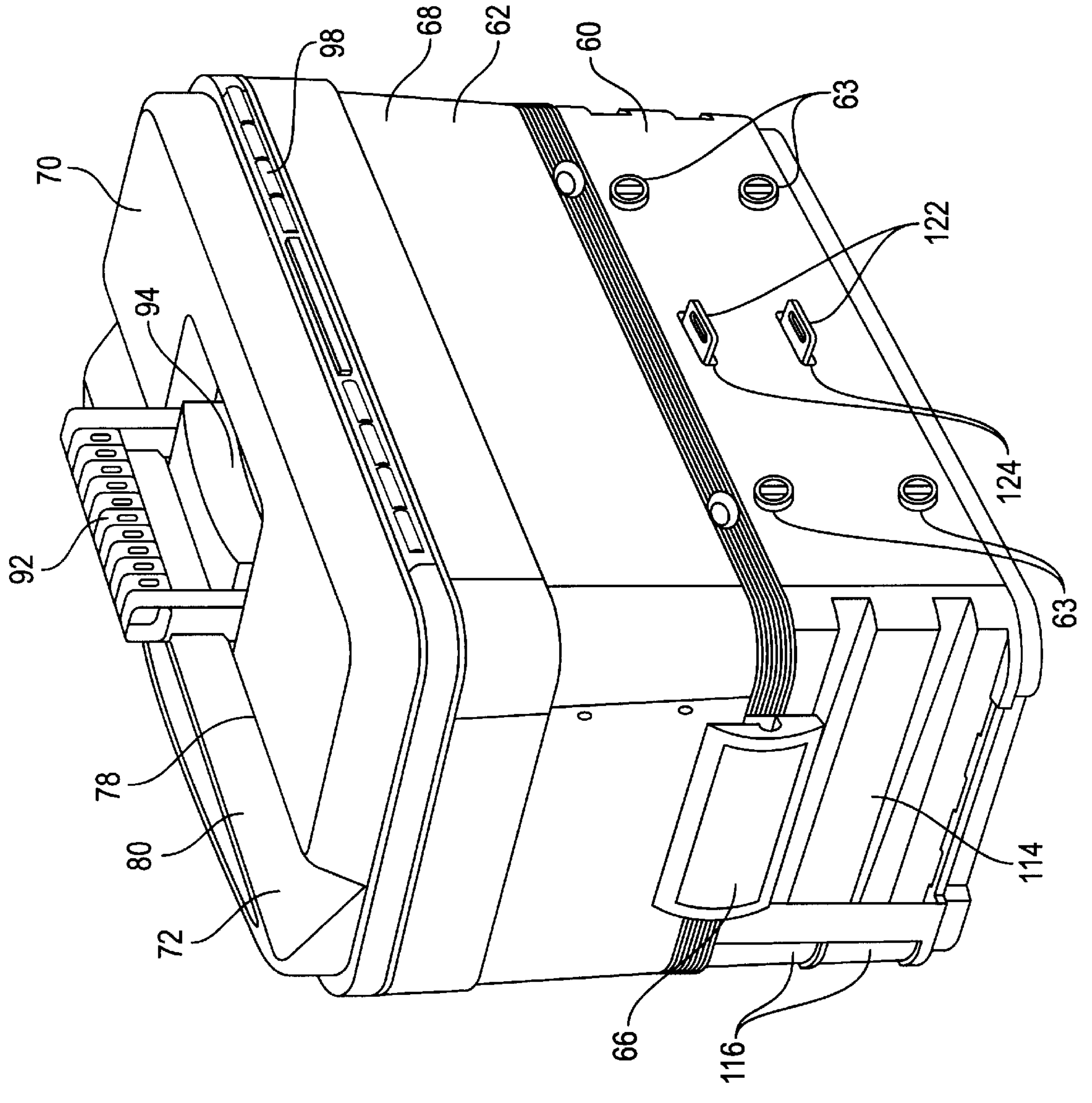
FIG. 6 is a perspective rear view of the toolcase and drawers assembly of FIGS. 4 and 5.

According to a preferred embodiment of the present invention, all of drawers 116 are securable close via a single securing member 121 (best seen in FIG. 7), which engages securing elements 122 attached to a the aft of drawers 116 and protrudes through dedicated holes 124 formed in casing 114 (FIG. 6).

Preferably, single securing member 121 is attached to or forms a part of handle 56, such that when handle 56 is retracted securing member 121 simultaneously secures all of drawers 116 closed.

It is common for toolbox drawers to have locks on their front side. Due to handle 56 of assembly 50 it is possible to have the drawers secured/locked from behind.

In any case, drawers 116 are preferably supplemented with opening handles 123. Handles 123 are preferably also designed to secure/lock drawers 116 to casing 114 when closed.

A common problem associated with cabinets and drawers of any construction is that the drawers have to remain to a significant percentage within the casing of the product even in the extended position to avoid falling out. The drawers assembly described herein is notable for having cabinet rollers appended beyond the extremity of the product. This feature allows the drawers to be pulled out further than would otherwise be possible.

According to a preferred embodiment of the present invention base cabinet 52 of rolling containers assembly 50 includes a casing or frame 126 to which handle 56 and wheels 54 are engaged. Base cabinet 52 further includes a flipping bin 128. Casing or frame 126 is formed with a housing 127 for holding handle 56 when extended and for accepting handle 56 when retracted. Thus, handle 56 is retractable into, and extendible from, housing 127.

Casing or frame 126 is formed having a base element 129. Base 129 is designed to be in contact with the floor when assembly 50 is positioned in its upright position. Wheels 54 are designed to have substantially no or minimal contact with the floor when in the upright position. Wheels 54 take firm contact with the floor only when assembly 50 is in its locomoting position, as shown, for example, in FIG. 24. Casing 126 and casing 114 may each be considered to be a frame or frame portion, and together may be considered to be a frame assembly irrespective of whether the casing portions or frame portions 114, 126 can be separated from one another. In the preferred embodiment, as shown, the frame assembly can be separated into portions 114, 126.

Flipping bin 128 is rotatable with respect to casing 126 and has an upper opening 130. Casing 126 is preferably formed with an upper rim 132. Rim 132 is supplemented with anchor holes 134 which serve for attaching strings 136 (shown in FIG. 24) for effecting carriage of desired items on top of base cabinet 52 when additional cabinet(s) 58 are removed.

Handle 52 is preferably formed with additional holes 138 which further serve for attaching strings 136 for effecting the carriage of bigger items on top of base cabinet 52.

Thus, the anchor holes situated fore and aft at the top of the base cabinet allow the base cabinet and the handle to be used as a separate dolly. This is particularly useful when additional materials have to be carried to the working site.

According to a preferred embodiment of the present invention reel 64 is a revolving electrical reel rotatably attached to casing 126, within a dedicated recession 140 formed therein, such that reel 64 would not protrude from the general outline of base cabinet 52.

According to a preferred embodiment of the present invention reel 64 is removable (disconnectable/detachable) from casing 126, and may function as a standalone reel.

Figure 7:
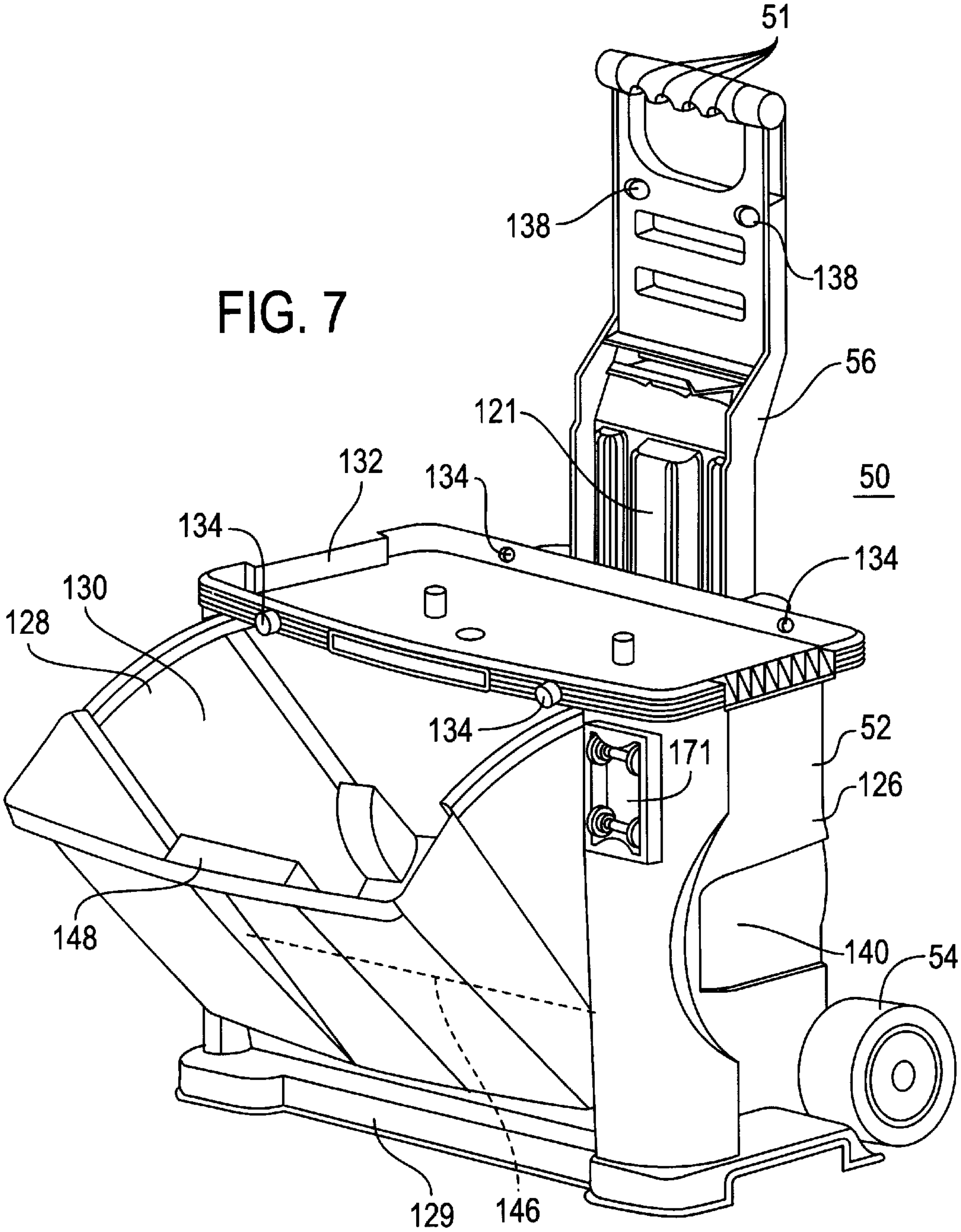
FIG. 7 is a perspective front view of a base cabinet of the rolling containers assembly according to the present invention.
Figure 8:
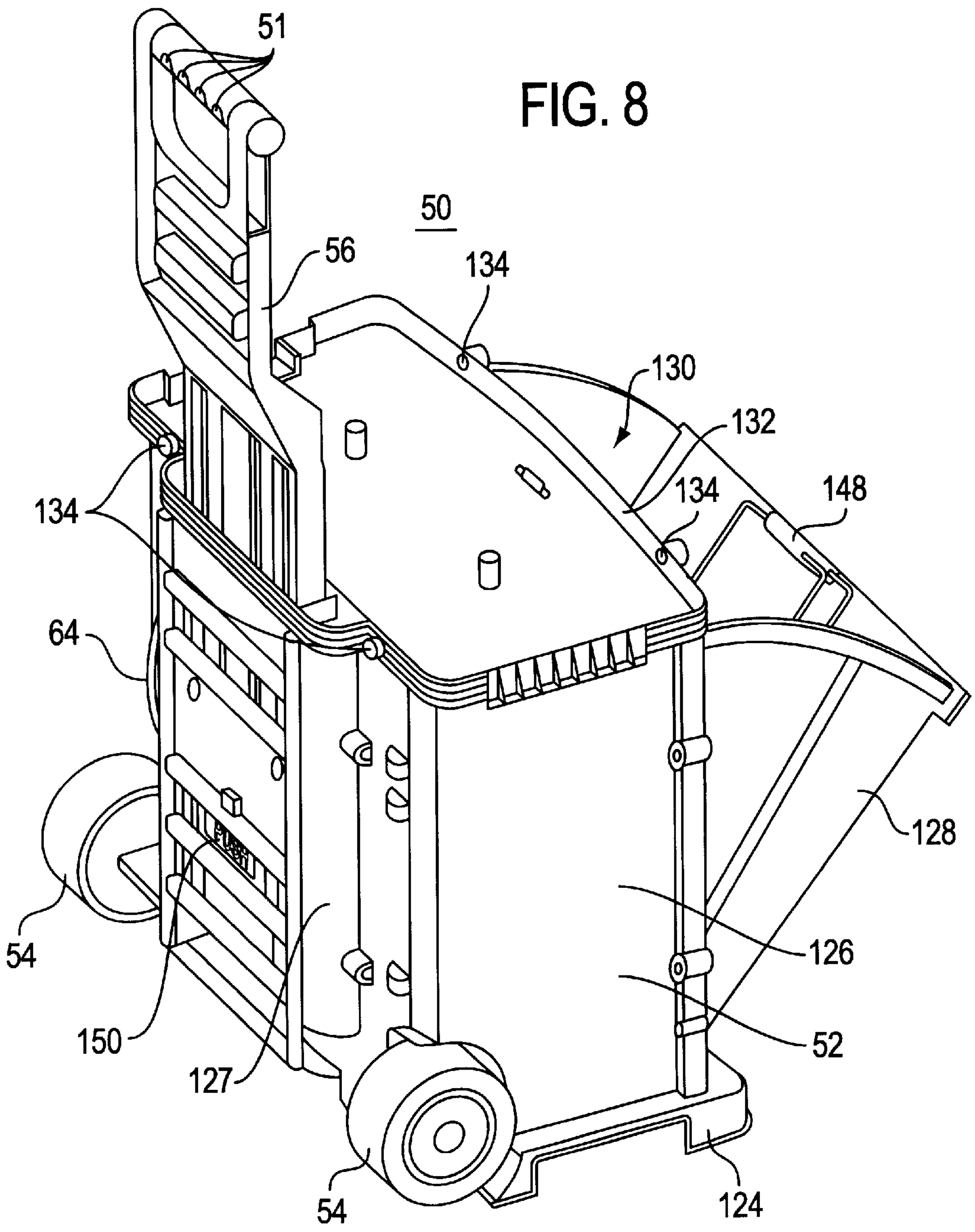
FIG. 8 is a perspective rear view of the base cabinet of FIG. 7.
Figure 9:
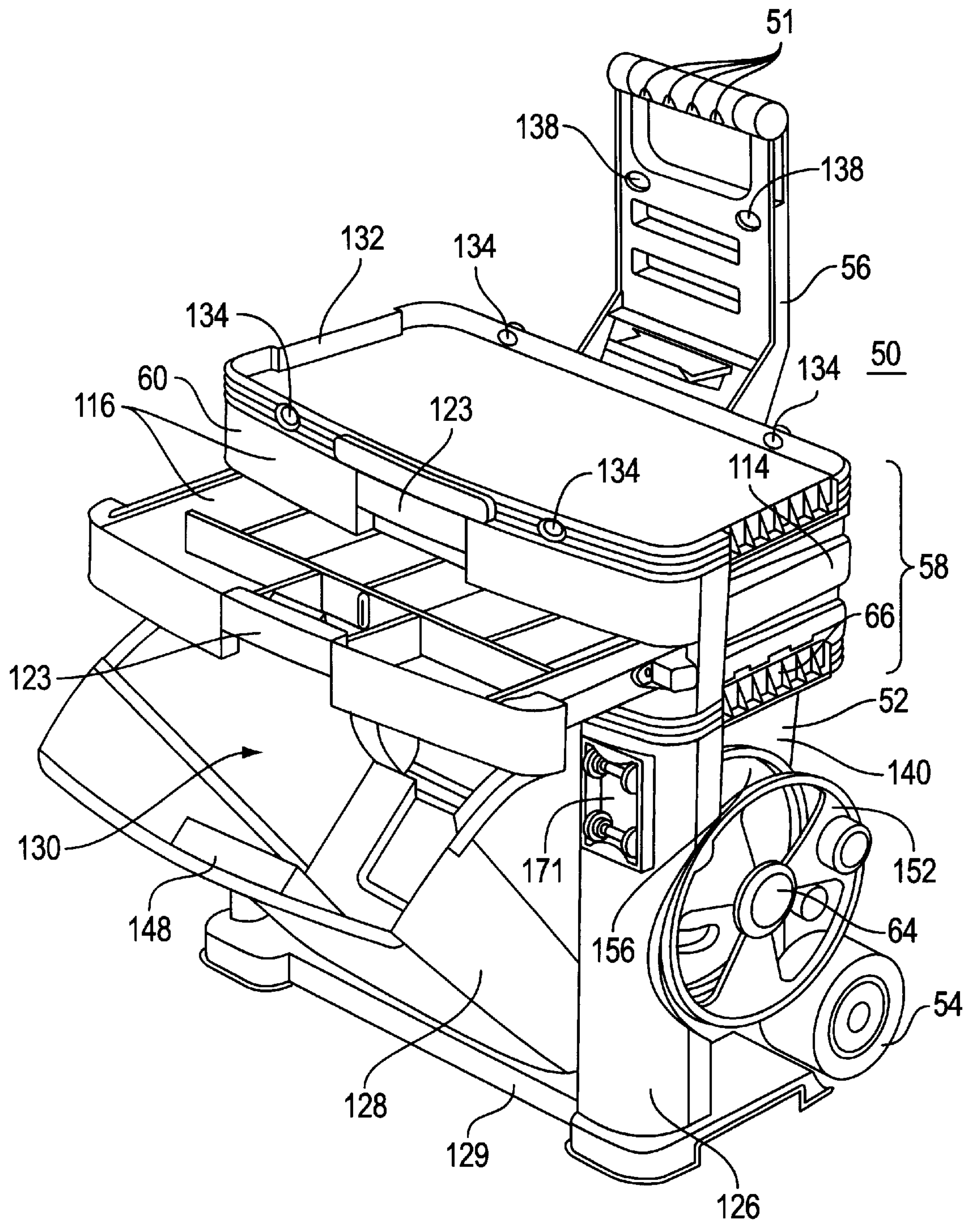
FIG. 9 is a perspective front view of the base cabinet and the drawers assembly of the rolling containers assembly according to the present invention.
Figure 25:
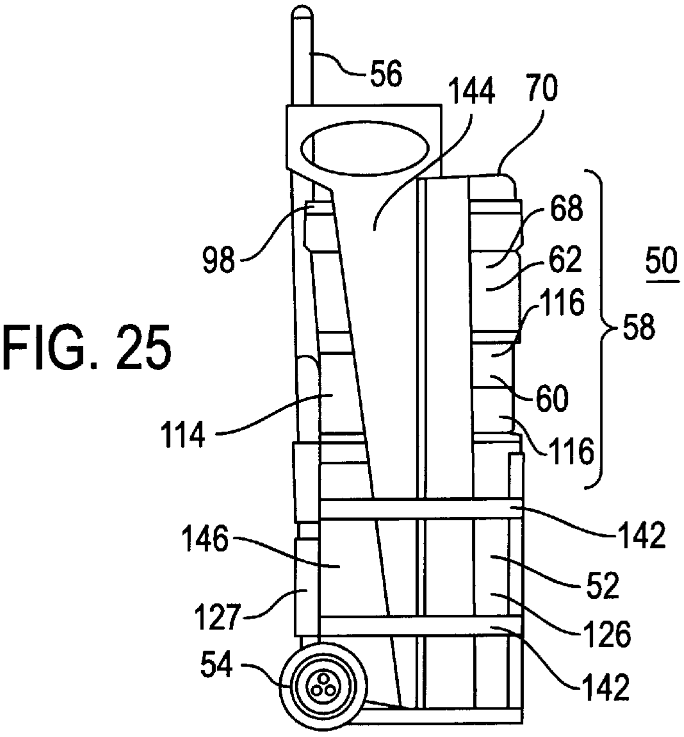
FIG. 25 is a side view of the rolling containers assembly according to the present invention, demonstrating the attachment of a working tool thereon via bands.

As specifically shown in FIG. 25, according to a preferred embodiment of the present invention casing 126 is supplemented with at least two elastic bands 142, designed for engaging desired long items 144 (e.g., a saw) along a side 146 thereof According to another preferred embodiment of the present invention flipping bin 128 is rotatably connected to casing 126 via a hinge, marked by a broken line 146 in FIG. 7, located such that bin 128 opens when reaches beyond a center of gravity point and closes when is before the center of gravity point, such that bin 128 fully opens or closes when used. This feature of bin 128 is effective also when load is loaded therein. Therefore, when used, bin 128 remains open irrespective of its content load. Conversely bin 128 remains closed even when not locked in the transportable situation of assembly 50, shown, for example in FIG. 24.

However, according to a preferred embodiment of tile invention bin 128 is equipped with a front lock 148, which locks bin 128 to casing 126.

Handle 56 is deployed on the back side of base cabinet 52 and is selected conventional in its design, as seen, for example, in rolling luggage pieces, e.g., by SAMSONITE. However, such handles have so far not been employed as described herein.

According to a preferred embodiment of the present invention, handle 56 is completely detachable from assembly 50 to allow for separation of the components thereof for storage or transportation in confined spaces i.e., closets or car trunks.

Handle 56 is attached/detached from base cabinet 52 via a flexing member 150. Flexing members are well known in the art of plastics and require no further description herein.

Reel 64 is functionally notable for the following features. First, as already mentioned hereinabove, it is removable from casing 126 and may serve as a separate standalone reel, functioning independently of assembly 50. Reel 64 is locked onto its location (recession 140) on casing 126 by a quarter turn locking mechanism as further detailed hereinbelow.

Current reels for electric cables or other purposes (e.g., garden/pool hoses) share a common construction i.e., a reel comprised of a hollow core and round flanges rotating about an axle. Such reels are typically appended with legs arrangement or a handle to improve functionality.

Reel 64 according to the present invention appears traditional by intent, but its functionality is quite different form the current art.

Figure 10:
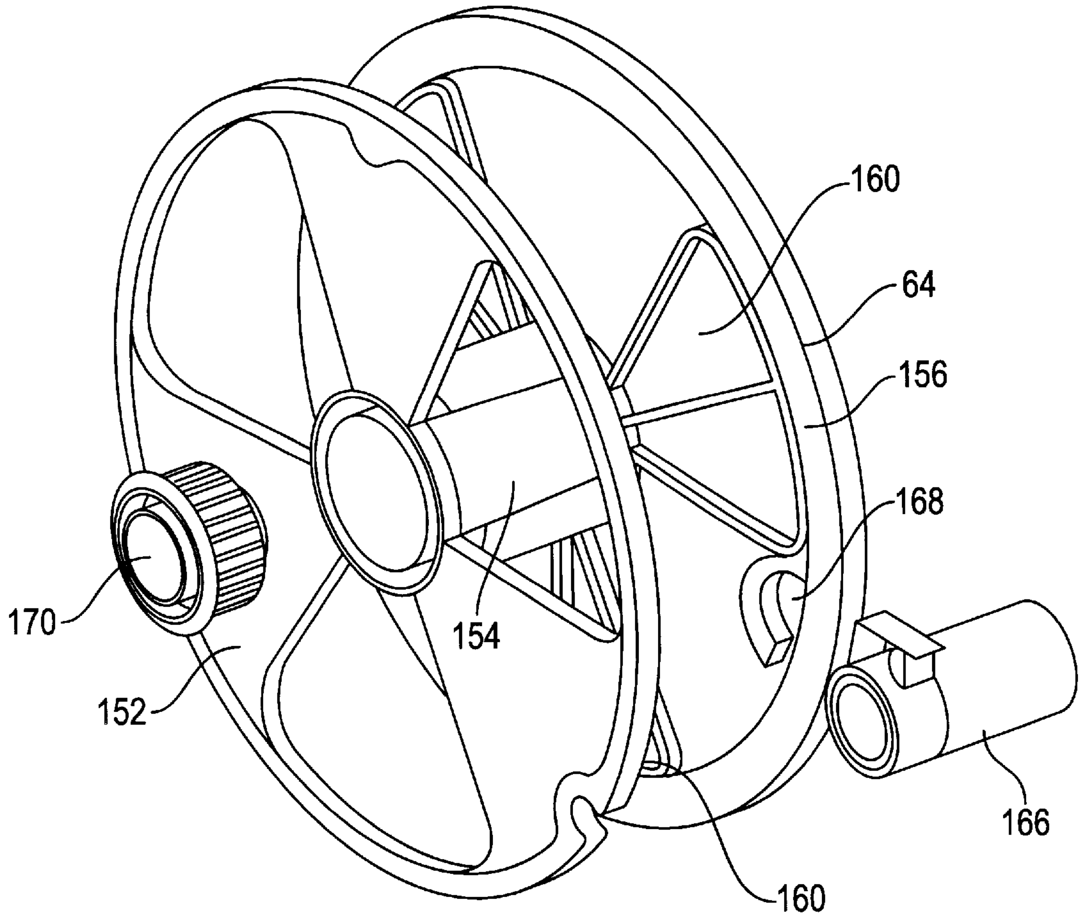
FIG. 10 is a perspective view of a reel of the rolling containers assembly according to the present invention.
Figure 11:
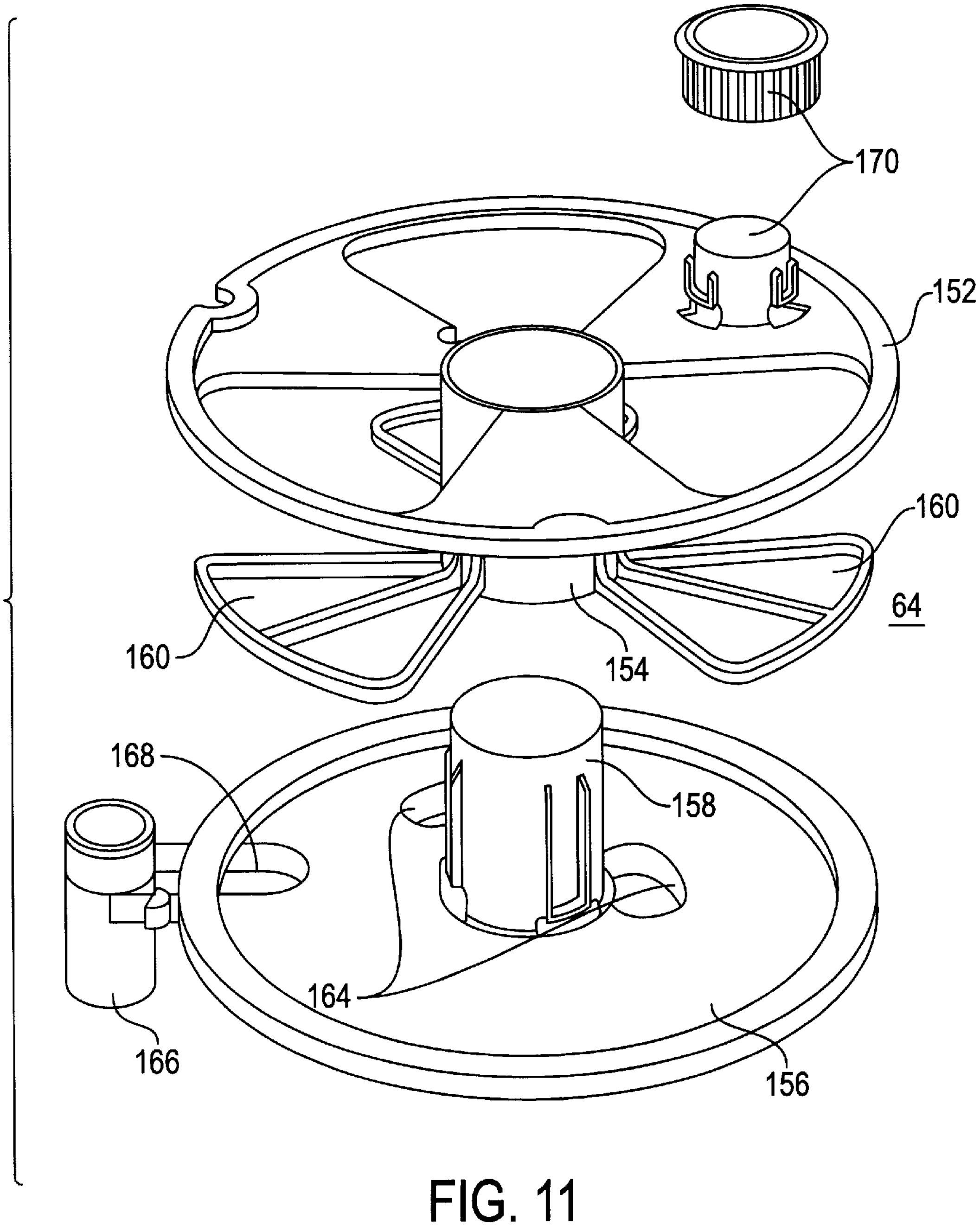
FIG. 11 is an exploded perspective view of the reel of FIG. 10.
Figure 12C:
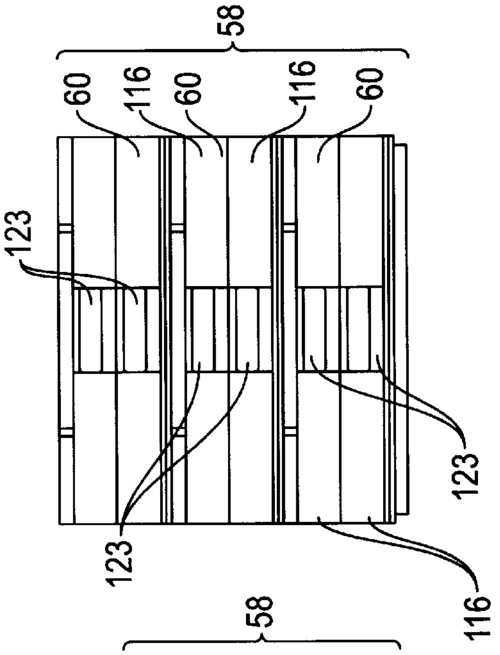
FIG. 12 is a front view of the rolling containers assembly according to the present invention demonstrating its modularity.
Figure 12B:
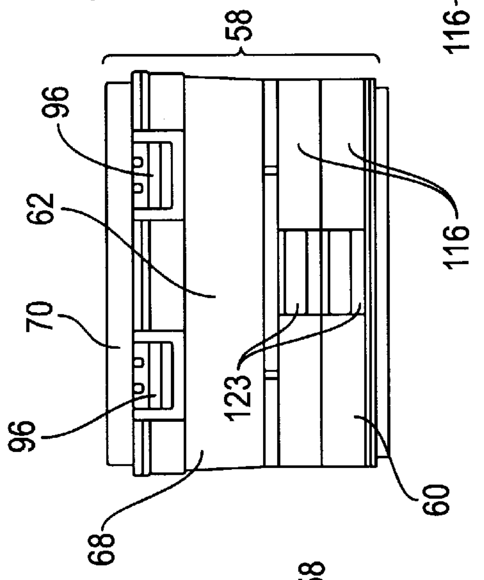
Figure 12A:
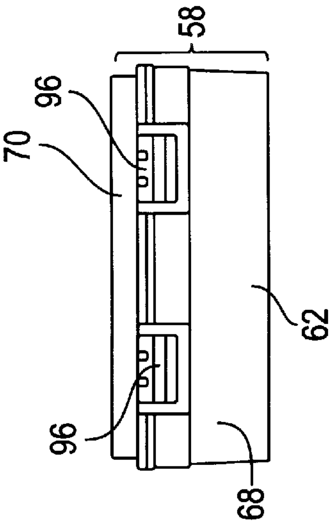
Figures 12D, 12E, 12F:
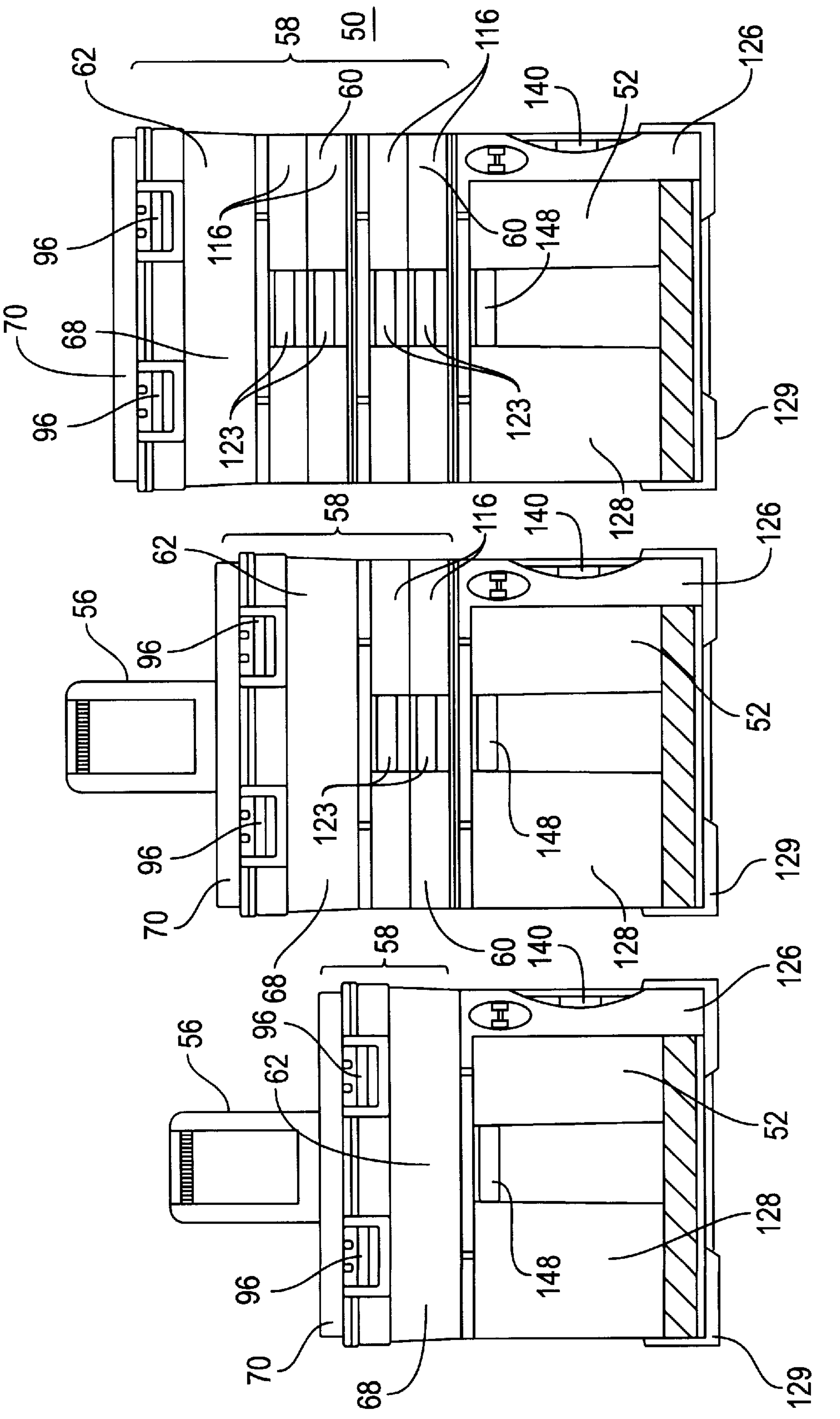
Figure 13A:
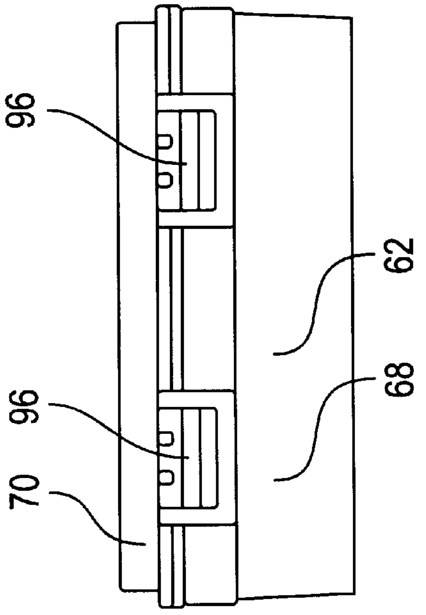
FIGS. 13*a* and 13*b* are front and side views of the toolcase of the rolling container assembly according to the present invention, demonstrating an asymmetric groove formed in its cover.
Figure 13B:
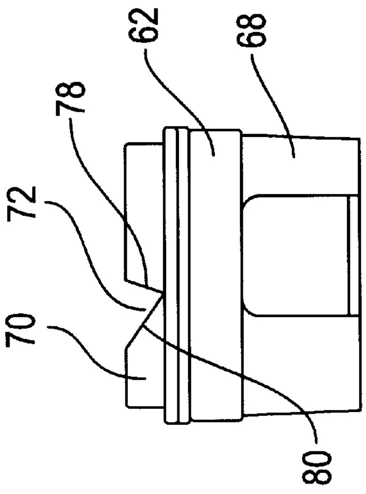

As best seen in FIGS. 10 and 11, reel 64 includes a front round flange 152 which is affixed to a hub or core 154 which revolves. Reel 64 further Mcludes a back flange 156 which is affixed to yet another core 158 which does not revolve. Core 158 rotatably fits inside core 154. Core 158 therefore acts as an axle for core 154 and flange 152 to revolve on. Functionality of such an arrangement would be significantly impaired without a revolving back flange to carry the weight of the cord and prevent friction. To this end, front flange 152 and core 154 carry several (e.g., three or more) paddles 160 deployed at the rear end of core 154. The exterior surface of core 54 defines a coil supporting surface and the inner surfaces of the flanges 152, 156 active coil retaining surfaces. As can be appreciated, when a flexible member, such as an extension cord, is wound about the hub 154, the flanges (i.e., the coil retaining surfaces) restrain the coiled member against lateral movement with respect to the hub 154.

When assembled paddles 160 lay against static back flange 156, rotating thereon. Paddles 160 effectively carry the weight of the cord preventing spread and allowing the otherwise revolving rear flange to act as a static mounting point.

Figure 26A:
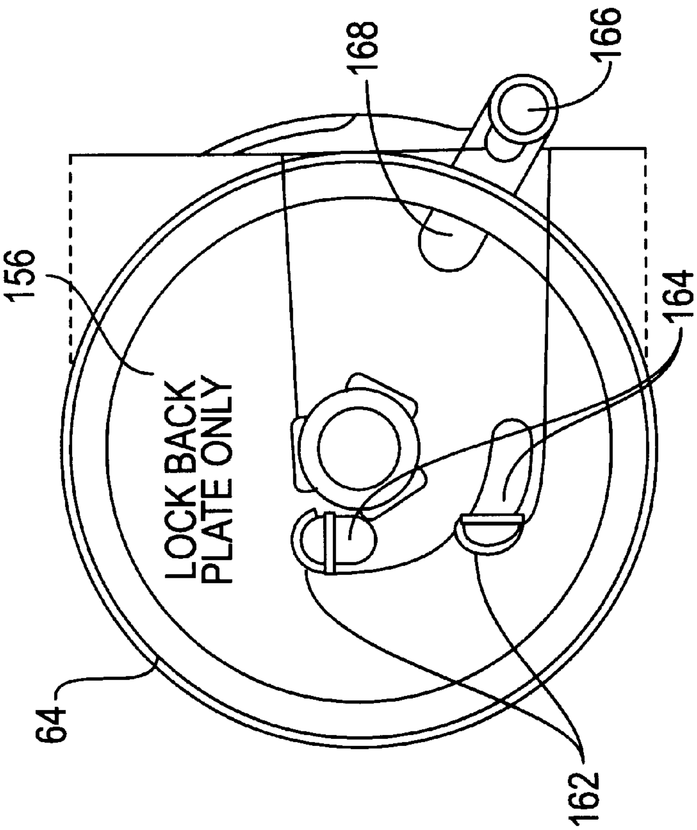
FIGS. 26*a* and 26*b* are side views of a backplate of the reel of the rolling containers assembly according to the present invention in locked and unlocked positions.
Figure 26B:
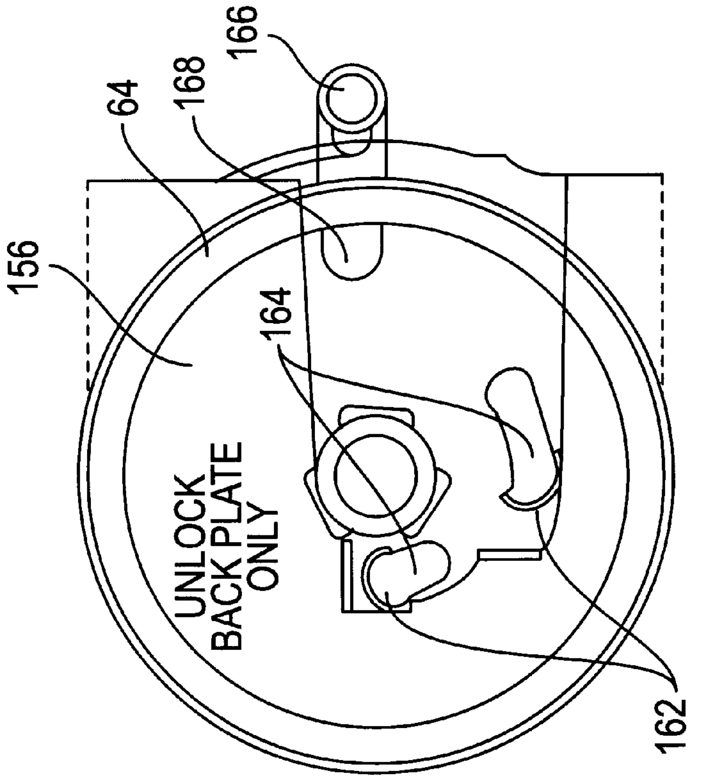
Figure 27:
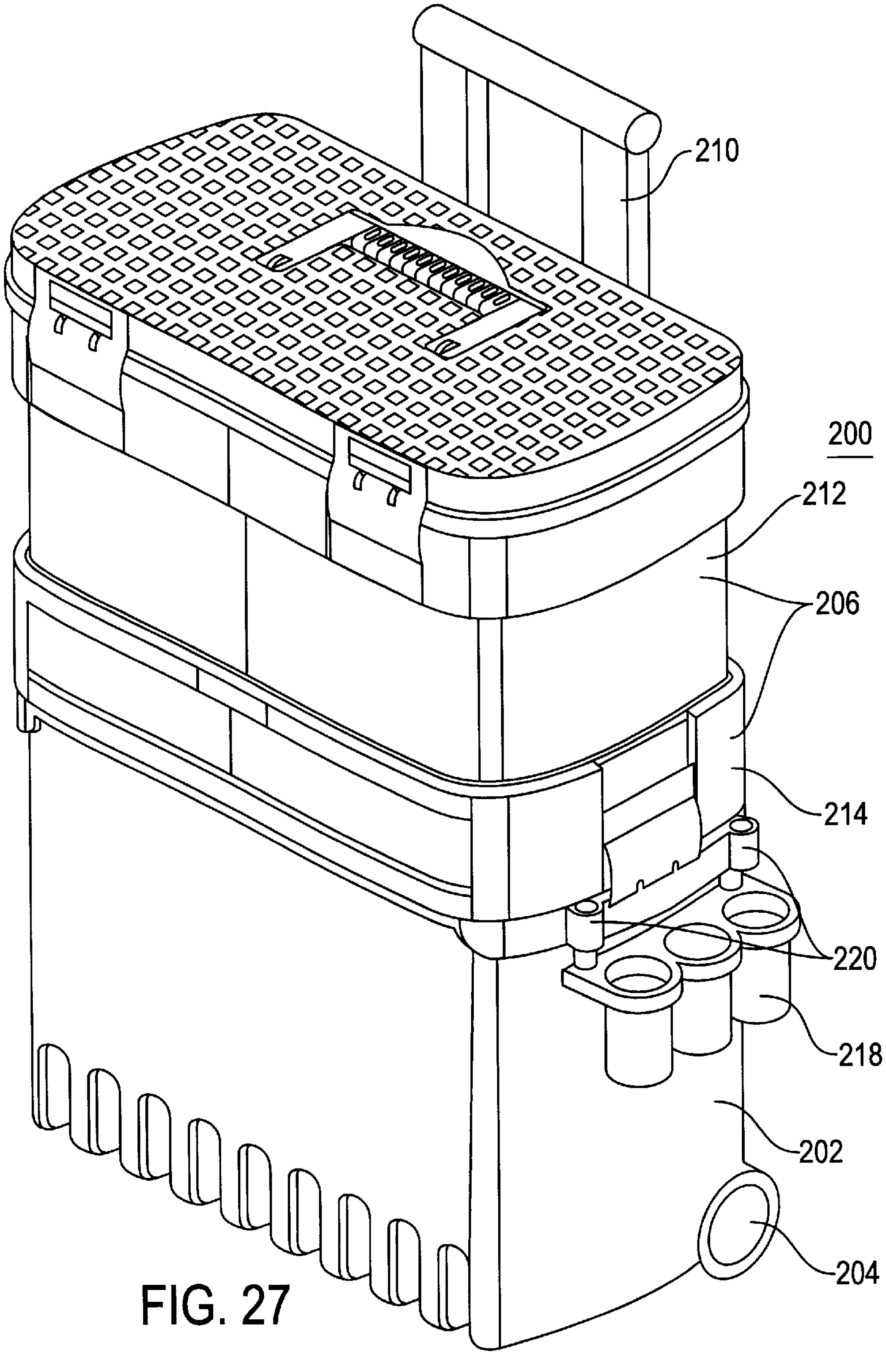
FIGS. 27, 28 and 29 are perspective views of another embodiment of the rolling containers assembly according to the present invention.
Figure 28:
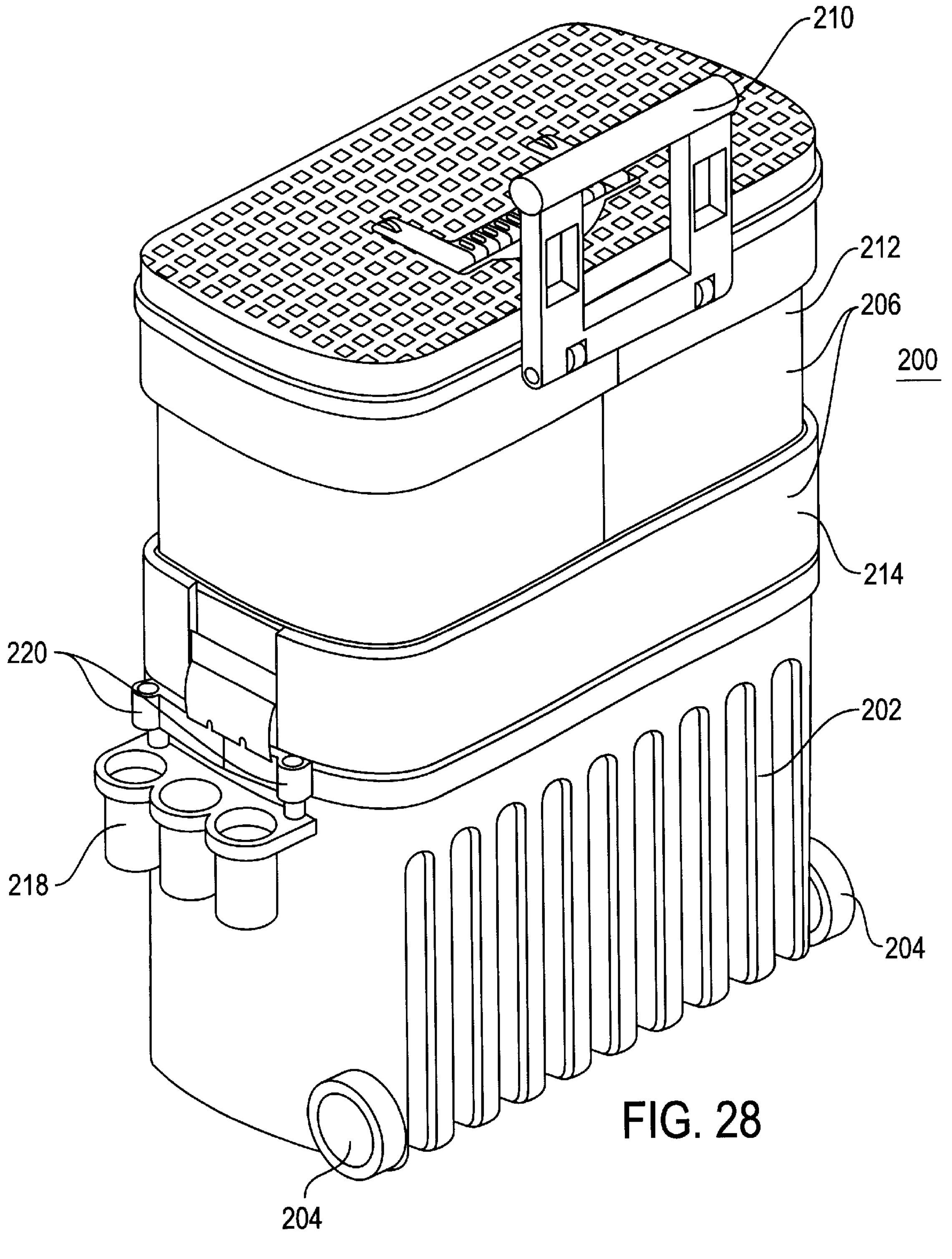
Figure 29:
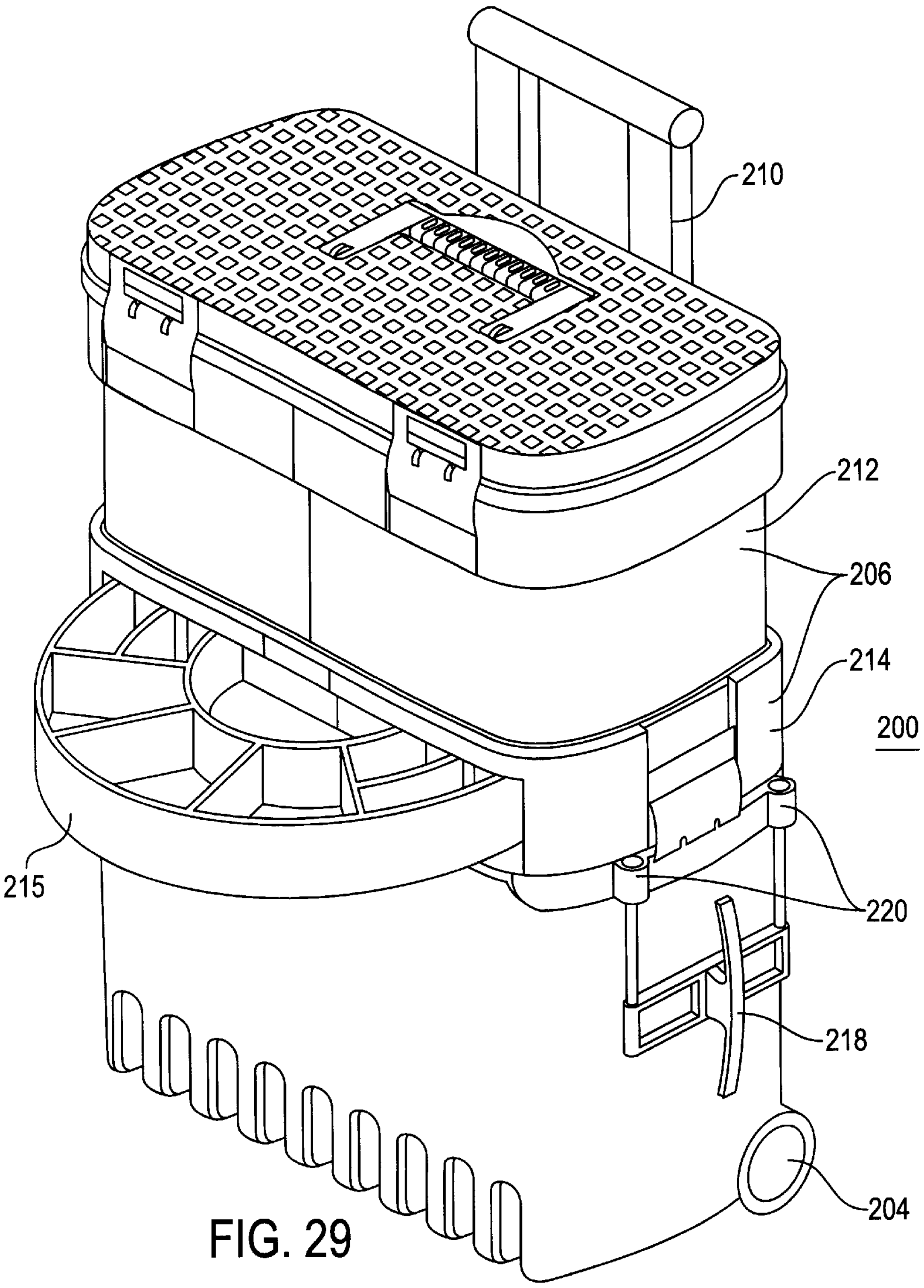
Figure 30A:
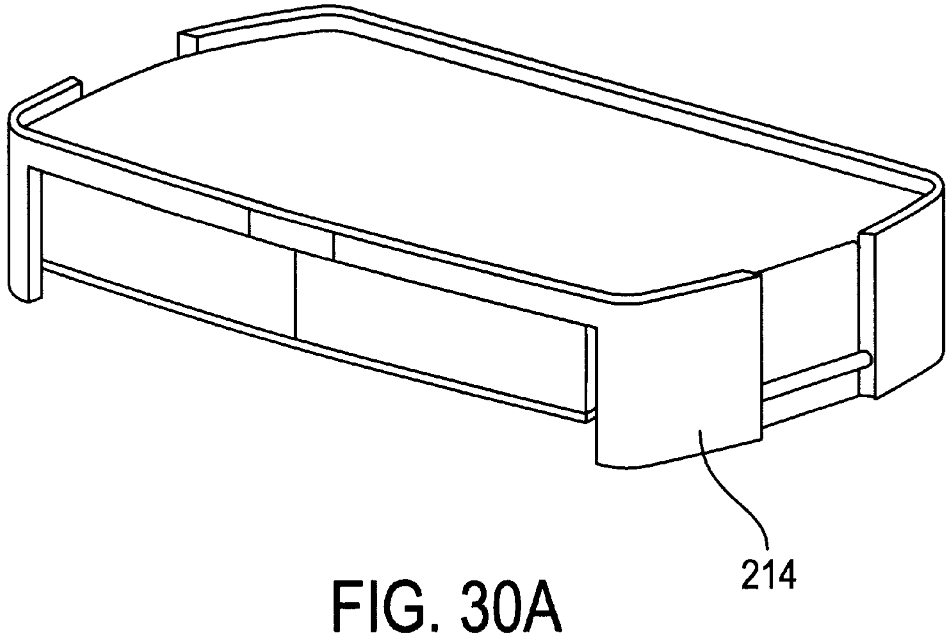
FIGS. 30*a* and 30*b* are perspective views of an organizer of the rolling containers assembly according to its second embodiment.
Figure 30B:
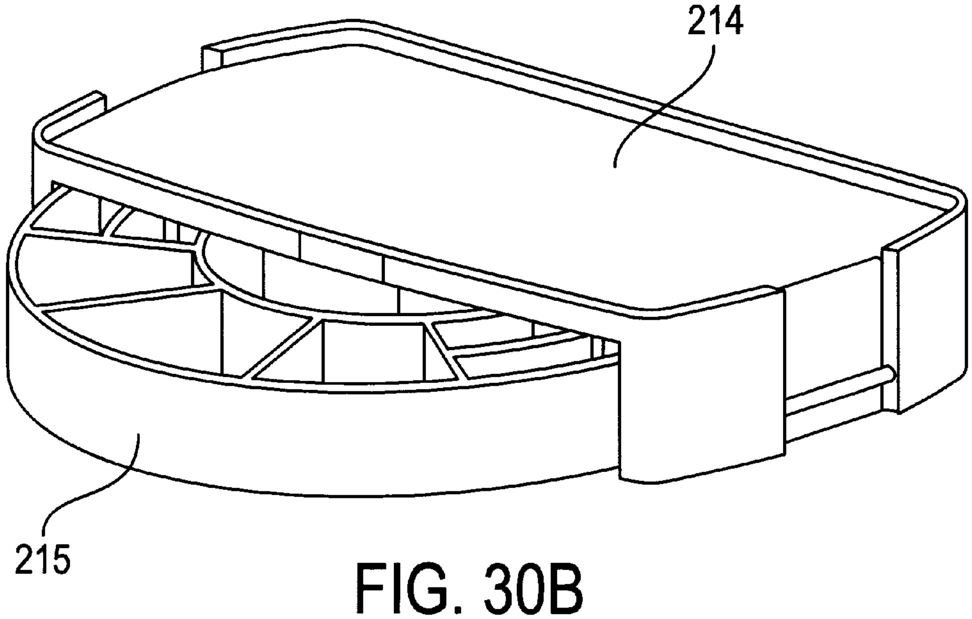
Figure 31:
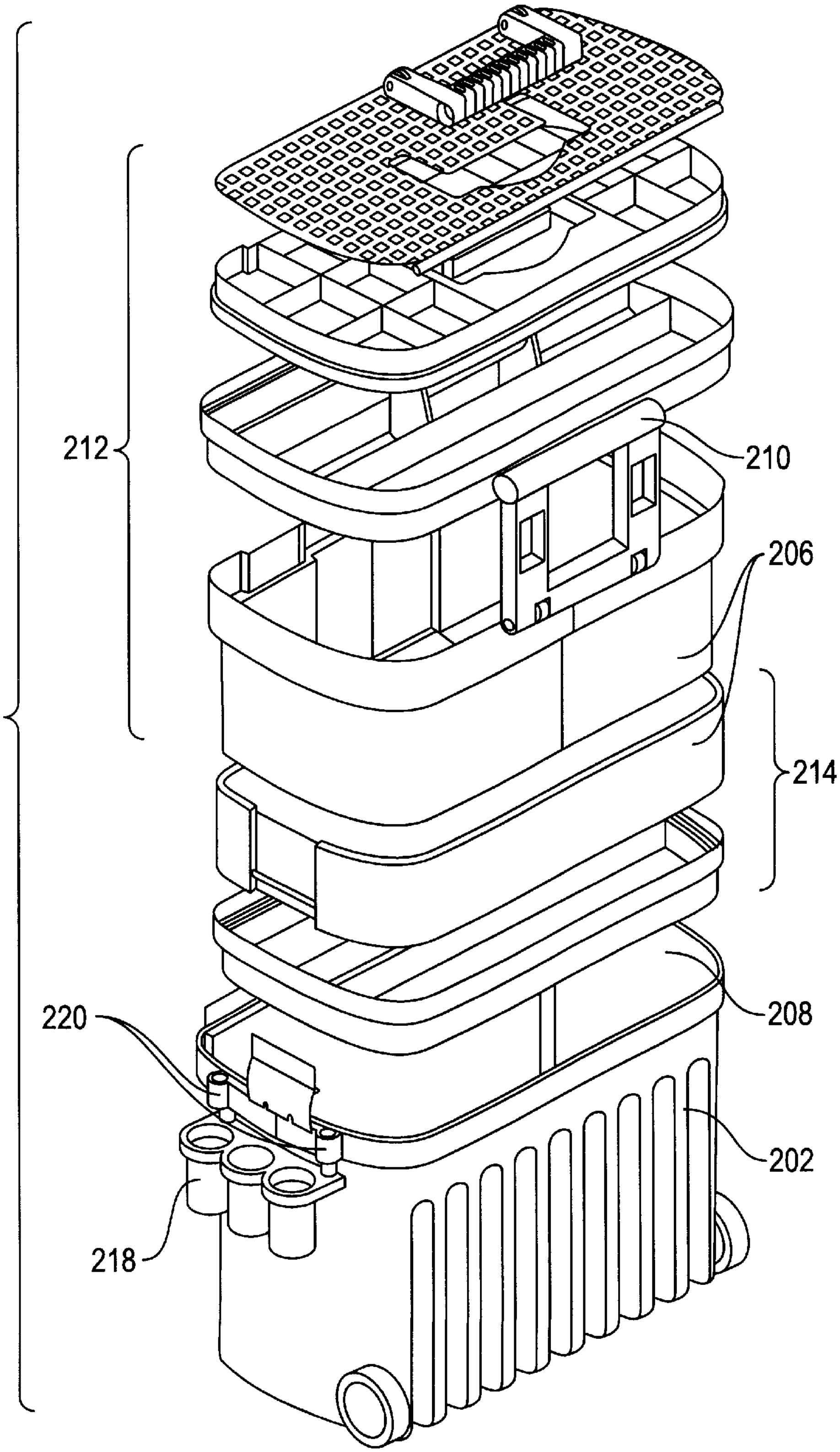
FIG. 31 is an exploded perspective view of the rolling containers assembly according to its second embodiment.

As best seen in FIGS. 26*a*–*b* two protrusions 164 formed in recession 140 of casing 126 are canning into corresponding holes 162 formed in backplate 156, serving to lock/unlock plate 156 to assembly 50 by a quarter of a turn.

Back plate 156 is supplemented with a lever 166. Lever 166 is positioned such that when plate 156 is in its locked position, lever is pulled over a dedicated protrusion 167 (best seen in FIG. 2), formed in casing 126, thereby securing reel 64 in its locked position, such that inadvertent disconnection of reel 64 from base cabinet 52 becomes practically impossible.

Reel 64 is preferably further supplemented with a revolving handle 170 asymmetrically attached to front plate 152 for releasing a cord engaged thereon. It can be appreciated from the figures that a guiding aperture 171 is provided on the base cabinet 52 adjacent the reel 64. As can be readily understood from the figures, this aperture 171 is provided so that a flexible elongated extension cord member wound on the reel 64 can be fed through the aperture 171 as the member pays out from the reel 64.

FIGS. 27–31 show another embodiment of the rolling containers assembly according to the present invention, which is referred to hereinbelow as assembly 200.

Like assembly 50, assembly 200 includes a base cabinet 202 which is supplemented with wheels 204 for locomoting rolling containers assembly 200.

Assembly 200 further includes at least one additional cabinet 206 which is removably connectable (by snapping) on top 208 of base cabinet 202.

Additional cabinet 206 includes a pulling handle 210 for effecting locomotion.

According to a preferred embodiment additional cabinet 208 is a clamshell style case 212 and/or a carousel organizer 214.

Carousel organizer 214 includes a revolving drawer 215 which rotates radially about a fixed point and therefore allows for more complete access of contents than a conventional drawer which is required to remain partially in the container.

According to a preferred embodiment base cabinet 202 includes accessories 218 anchor points 220. Accessories 218 may be of any type. Accessories 218 anchor points 220 serve as a custom attachment feature present on base cabinet 202 which allows various molded components with different functionality to be attached thereon to tune the product for specific purposes (e.g., fishing, gardening, etc.). Other features of assembly 200 are similar to those described hereinabove with respect to assembly 50.

According to a preferred embodiment of the invention all of the components of the rolling containers assembly are injected plastic components.

Thus, the present invention relates to improvements to toolboxes for industrial and home/hobby applications.

The rolling containers assembly according to the present invention is the first modular rolling workshop having a retractable/extendible handle system.

Breaking the assembly into three vertically modular components provides several functional advantages.

First, the total weight is dividable for purposes of lifting the assembly over steps, into car tranks, etc.

Second, the vertical configuration is ergonomically practical when accessing the assembly's interior.

Third, when disassembled the assembly according to the present invention is storable is small confinements, such as the trunk of an average sedan.

Finally, the modular vertical nature of the rolling containers assembly according to the present invention allows a user to take "as much as he needs".

Thus, for small jobs the toolcase or the toolcase and the drawers assembly can be deployed with the traditional side claw latches.

In any case, when the toolcase and drawers assembly are removed the remaining base cabinet and back handle transform into a dolly for additional load carrying.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An apparatus for transporting articles, comprising:

a removable upper storage container having interior surfaces defining an interior space in which articles to be transported can be stored;

a wheeled device comprising:

(i) a frame, (ii) one or more rotatable ground engaging wheels connected with said frame and constructed and arranged to rollingly support said frame (iii) a lower storage container being mounted below said removable upper storage container on portions of said frame that are fixed with respect to an axis of rotation of said wheels so as to prevent said lower storage container from being removed from said one or more wheels and carried separately from said one or more wheels, (iv) structure providing a generally downwardly facing fixed ground engaging surface, said ground engaging surface being located forwardly of said one or more wheels and being constructed and arranged to engage the ground, (v) a manually engageable handle member extending generally upwardly from said frame, and (vi) removable container supporting structure constructed and arranged to removably support said removable upper storage container;

said removable upper storage container being removably mounted on the removable container supporting structure of said wheeled device such that said supporting structure supports said removable upper container above said lower storage container with a substantial portion of said removable container extending upwardly from said removable container supporting structure, thereby allowing the aforesaid substantial portion of said removable container to be manually engaged for removal and handling of said removable upper container separately from said lower storage container;

said handle member and said one or more ground engaging wheels of said wheeled device being constructed and arranged to enable a user to pull said handle member generally rearwardly so as to tilt said wheeled device rearwardly from (a) a substantially upright position wherein said fixed ground engaging surface engages the ground so as to stably support said wheeled device in a freestanding manner such that the interior spaces of said lower and removable containers can be accessed or said removable container can be removed from said removable container supporting structure and handled separately from said wheeled device to (b) a tilted rolling movement position wherein said fixed ground engaging surface is moved generally upwardly out of engagement with the ground in such a manner that said wheeled device is rollingly supported by said ground engaging wheels with the weight of said wheeled device and said removable container being supported only by the one or more ground engaging wheels and the portion of the handle member engaged by the user, thereby enabling the user to roll said apparatus to a desired location by pushing or pulling said handle member in a desired direction.

2. An apparatus according to claim 1, wherein said removable upper container has a generally upwardly facing opening and a pivoting lid that moves between an open position permitting access into the interior space of said removable container through said generally upwardly facing opening and a closed position preventing access in to the interior space of said removable upper container through said generally upwardly facing opening.

3. An apparatus according to claim 2, wherein said removable upper container has a handle on said pivoting lid for manual grasping when said removable container is being carried.

4. An apparatus according to claim 3, wherein said fixed lower storage container is a cabinet mounted in a generally forwardly facing opening in said frame, said cabinet comprising at least one pivotally mounted door selectively movable between an open position permitting access to the interior space of said lower storage container through said generally forwardly facing opening in said frame and a closed position preventing access to the interior space of said lower storage container through said generally forwardly facing opening in said frame.

5. An apparatus according to claim 2, wherein said removable upper container has a releasable latch on said pivoting lid for releasably latching said lid in the closed position thereof.

6. An apparatus according to claim 5, wherein said removable upper container is a storage drawer assembly comprising:

a drawer supporting frame having interior surfaces defining a drawer receiving space; and a storage drawer having a generally upwardly facing access opening permitting access to the interior space of said drawer, said storage drawer being mounted within said drawer receiving space such that said drawer is selectively movable between (1) an open position wherein said drawer extends outwardly from said frame to permit access to said interior space through said generally upwardly facing access opening and (2) a closed position wherein said drawer is received within said frame to prevent access to said interior space through said access opening.

7. An apparatus according to claim 6, further comprising a second removable storage container removably mounted above said storage drawer assembly such that said second removable storage container can be removed and handled separately from both said storage drawer assembly and said lower storage container.

8. An apparatus according to claim 7, wherein said second removable container has a generally upwardly facing opening and a pivoting lid that moves between an open position permitting access into the interior space of said second removable container through said generally upwardly facing opening and a closed position preventing access into the interior space of said second removable container through said generally upwardly facing opening.

9. An apparatus according to claim 8, wherein said removable container has a releasable latch on said pivoting lid for releasably latching said lid in the closed position thereof.

10. An apparatus according to claim 8, wherein said lower storage container comprises at least one pivotally mounted door selectively movable between an open position permitting access to the interior space of said lower storage container through a generally forwardly facing opening if said frame and a closed position preventing access to the interior space of said lower storage container through said generally forwardly facing opening of said frame.

11. An apparatus according to claim 1, wherein said one or more ground engaging wheels includes a pair of ground engaging wheels rotatably mounted to opposing sides of said lower storage container for rotation about a common axis.

12. An apparatus according to claim 1, wherein said handle member is connected directly to said frame.

13. An apparatus according to claim 1, wherein said removable container supporting structure is provided by a generally upwardly facing surface of said lower container.

14. An apparatus for transporting articles, comprising:

a first removable storage container having interior surfaces defining an interior space in which articles to be transported can be stored;

a second removable storage container having interior surfaces defining an interior space in which articles to be transported can be stored;

a wheeled device comprising:

(i) a frame, (ii) one or more rotatable ground engaging wheels connected with said frame and constructed and arranged to rollingly support said frame, (iii) a lower storage container being mounted below said first and second removable storage containers on portions of said frame that are fixed with respect to an axis of rotation of said wheels so as to prevent said lower storage container from being removed from said one or more wheels and carried separately from said one or more wheels, (iv) structure providing a generally downwardly facing fixed ground engaging surface, said ground engaging surface being located forwardly of said one or more wheels and being constructed and arranged to engage the ground, (v) a manually engageable handle member extending generally upwardly from said frame, and (vi) first removable container supporting structure constructed and arranged to removably support said first removable storage container;

said first removable storage container being removably mounted on said first removable container supporting structure such that said first supporting structure supports said first removable container above said lower storage container and such that said first removable storage container can be removed and handled separately from said lower storage container;

said first removable container providing second removable container supporting structure constructed and arranged to removably support said second removable container, said second removable container being removably mounted on said second supporting structure such that said second removable container supporting structure supports said second removable container above said first removable container and such that said second removable container can be removed and handled separately from said first removable storage container and said lower storage container;

said handle member and said one or more ground engaging wheels of said wheeled device being constructed and arranged to enable a user to pull said handle member generally rearwardly so as to tilt said wheeled device rearwardly from (a) a substantially upright position wherein said fixed ground engaging surface engages the ground so as to stably support said wheeled device in a freestanding manner such that the interior spaces of said lower and removable containers can be accessed or said removable container can be removed from said removable container supporting structure and handled separately from said wheeled device to (b) a tilted rolling movement position wherein said fixed ground engaging surface is moved generally upwardly out of engagement with the ground in such a manner that said wheeled device is rollingly supported by said ground engaging wheels with the weight of said wheeled device and said removable container being supported only by the one or more ground engaging wheels and the portion of the handle member engaged by the user, thereby enabling the user to roll said apparatus to a desired location by pushing or pulling said handle member in a desired direction.

15. An apparatus according to claim 14, wherein said second removable container has a generally upwardly facing opening and a pivoting lid that moves between an open position permitting access into the interior space of said second removable container through said generally upwardly facing opening and a closed position preventing access into the interior space of said second removable container through said generally upwardly facing opening.

16. An apparatus according to claim 15, wherein said removable container has a releasable latch on said pivoting lid for releasably latching said lid in the closed position thereof.

17. An apparatus according to claim 15, wherein said lower storage container comprises at least one pivotally mounted door selectively movable between an open position permitting access to the interior space of said lower storage container through a generally forwardly facing opening of said frame and a closed position preventing access to the interior space of said lower storage container through said generally forwardly facing opening of said frame.

18. An apparatus for transporting articles comprising:

(i) a drawer supporting frame assembly having interior surfaces defining a drawer receiving space;

(ii) structure providing a generally downwardly facing, fixed ground engaging surface, said ground engaging surface being constructed and arranged to engage the ground;

(iii) one or more rotatable ground engaging wheels connected with said drawer supporting frame assembly rearwardly of said ground engaging surface, said one or more wheels being constructed and arranged to rollingly support said drawer supporting frame assembly;

(iv) a manually engageable handle member;

(v) a storage drawer having interior surfaces defining an interior space configured to receive articles to be transported and a generally upwardly facing access opening permitting access to said interior space, said storage drawer being mounted within said drawer receiving space of said drawer supporting frame assembly such that said drawer is selectively moveable between (1) an open position wherein said drawer extends outwardly from said frame to permit access to said interior space through said generally upwardly facing access opening and (2) a closed position wherein said drawer is received within said drawer supporting frame assembly so as to prevent access to said interior space through said access opening; and (vi) flexible member storage means carried by said drawer supporting frame assembly for restraining an elongated flexible member in a wound manner thereon against lateral movement;

said handle member and said one or more ground engaging wheels being constructed and arranged to enable the user to pull said handle member generally rearwardly so as to tilt said drawer supporting frame assembly rearwardly from (a) a substantially upright position wherein said fixed ground engaging surface engages the ground so as to stably support said drawer supporting frame assembly in a freestanding manner and the elongated flexible member can wound about or unwound from said flexible member storage means to (b) a tilted rolling movement position wherein said fixed ground engaging surface is moved generally upwardly out of engagement with the ground in such a manner that said drawer supporting frame assembly is rollingly supported by said ground engaging wheels, with the weight of said drawer supporting frame assembly being supported only by the one or more ground engaging wheels and the portion of the handle member engaged by the user, thereby enabling the user to roll said apparatus to a desired location by pushing or pulling said handle member in a desired direction;

said storage drawer being selectively movable between the open and closed positions thereof when said drawer supporting frame assembly is in said substantially upright position and when said drawer supporting frame assembly is in said tilted rolling movement position thereof;

said flexible member storage means being constructed and arranged such that the elongated flexible member can be unwound therefrom when said drawer supporting frame assembly is in said tilted rolling movement position thereof to thereby enable the flexible member to be unwound from said reel as said drawer supporting frame assembly is being rolled for transporting articles;

wherein the drawer supporting frame assembly includes a first portion connected with the wheels and a second portion removably mounted with respect to said first portion, the drawer receiving space being provided by said second portion of said drawer supporting frame assembly to enable said drawer receiving space and the storage drawer to be transported independently from said wheels.

19. An apparatus according to claim 18, wherein said first portion of said drawer supporting frame assembly defines a storage container receiving space, and further comprising a storage container received within said container receiving space.

20. An apparatus according to claim 19, wherein said second portion of said drawer supporting frame assembly is removably mounted above said first portion of said drawer supporting frame assembly.

21. An apparatus according to claim 20, wherein said container is pivotally mounted on said first portion of said drawer supporting frame assembly to permit access to an interior of said container.

* * * * *